(12) United States Patent
Perez et al.

(10) Patent No.: US 9,645,654 B2
(45) Date of Patent: May 9, 2017

(54) INITIALIZING PREDICTIVE INFORMATION FOR FREE SPACE GESTURE CONTROL AND COMMUNICATION

(71) Applicant: Leap Motion, Inc., San Francisco, CA (US)

(72) Inventors: Matias Perez, San Francisco, CA (US); Kevin Horowitz, San Francisco, CA (US)

(73) Assignee: LEAP MOTION, INC., San Francisco, CA (US)

( * ) Notice: Subject to any disclaimer, the term of this patent is extended or adjusted under 35 U.S.C. 154(b) by 336 days.

(21) Appl. No.: 14/560,923

(22) Filed: Dec. 4, 2014

(65) Prior Publication Data

US 2015/0153835 A1 Jun. 4, 2015

Related U.S. Application Data

(60) Provisional application No. 61/911,975, filed on Dec. 4, 2013.

(51) Int. Cl.
*G06K 9/00* (2006.01)
*G06F 3/01* (2006.01)

(52) U.S. Cl.
CPC ......... *G06F 3/017* (2013.01); *G06K 9/00208* (2013.01); *G06K 9/00355* (2013.01)

(58) Field of Classification Search
CPC ......... G06T 7/004; G06T 13/00; G06T 13/20; G06T 13/40; G06T 15/00; G06T 17/00; G06T 17/05; G06T 19/00; G06F 3/017
See application file for complete search history.

(56) References Cited

U.S. PATENT DOCUMENTS

| | | | | |
|---|---|---|---|---|
| 8,971,572 B1* | 3/2015 | Yin | ..................... | G06K 9/00355 345/173 |
| 2004/0046736 A1* | 3/2004 | Pryor | ..................... | A63F 13/02 345/156 |
| 2004/0247174 A1* | 12/2004 | Lyons | ................. | G06F 3/04845 382/154 |
| 2007/0126733 A1* | 6/2007 | Yang | ....................... | G06F 3/011 345/419 |
| 2013/0107003 A1* | 5/2013 | Lim | ........................ | G06T 13/40 348/46 |
| 2013/0182902 A1* | 7/2013 | Holz | .................... | G06K 9/3233 382/103 |

(Continued)

*Primary Examiner* — Wesley Tucker
(74) *Attorney, Agent, or Firm* — Haynes Beffel & Wolfeld; Ernest J. Beffel, Jr.

(57) ABSTRACT

The technology disclosed relates generally to image analysis and, in particular embodiments, to identifying shapes and capturing motions of objects in three-dimensional space. This is accomplished by calculation of numerous span lengths between opposing sides of a control object wherein each control object can consist of a plurality of span modes, each span mode identified by a frequency distribution of a plurality of sample points. The relevant sample points are derived from the pairing of boundary points on the opposing sides of the control object. For each span mode, span width parameters are calculated from at least part of the distribution of the span lengths, using the span width parameters to initialize at least a portion of a model of the control object, and generating predictive information from the initialized model.

28 Claims, 27 Drawing Sheets

(56) References Cited

U.S. PATENT DOCUMENTS

| | | | |
|---|---|---|---|
| 2013/0342443 A1* | 12/2013 | Huang | G06F 3/017 345/156 |
| 2014/0009384 A1* | 1/2014 | Valik | G06F 3/0304 345/156 |
| 2014/0177909 A1* | 6/2014 | Lin | G06K 9/00355 382/103 |
| 2014/0201666 A1* | 7/2014 | Bedikian | G06F 3/017 715/771 |
| 2014/0201690 A1* | 7/2014 | Holz | G06F 3/017 715/863 |
| 2015/0169176 A1* | 6/2015 | Cohen | G06F 3/04815 715/852 |
| 2015/0192987 A1* | 7/2015 | Gordon | G06F 1/3212 345/156 |
| 2015/0211919 A1* | 7/2015 | Julian | G06F 3/017 250/201.1 |
| 2016/0078289 A1* | 3/2016 | Michel | G06K 9/00389 345/156 |
| 2016/0124513 A1* | 5/2016 | Dal Zot | G06F 3/011 715/863 |
| 2016/0239080 A1* | 8/2016 | Marcolina | G06F 3/011 |

* cited by examiner

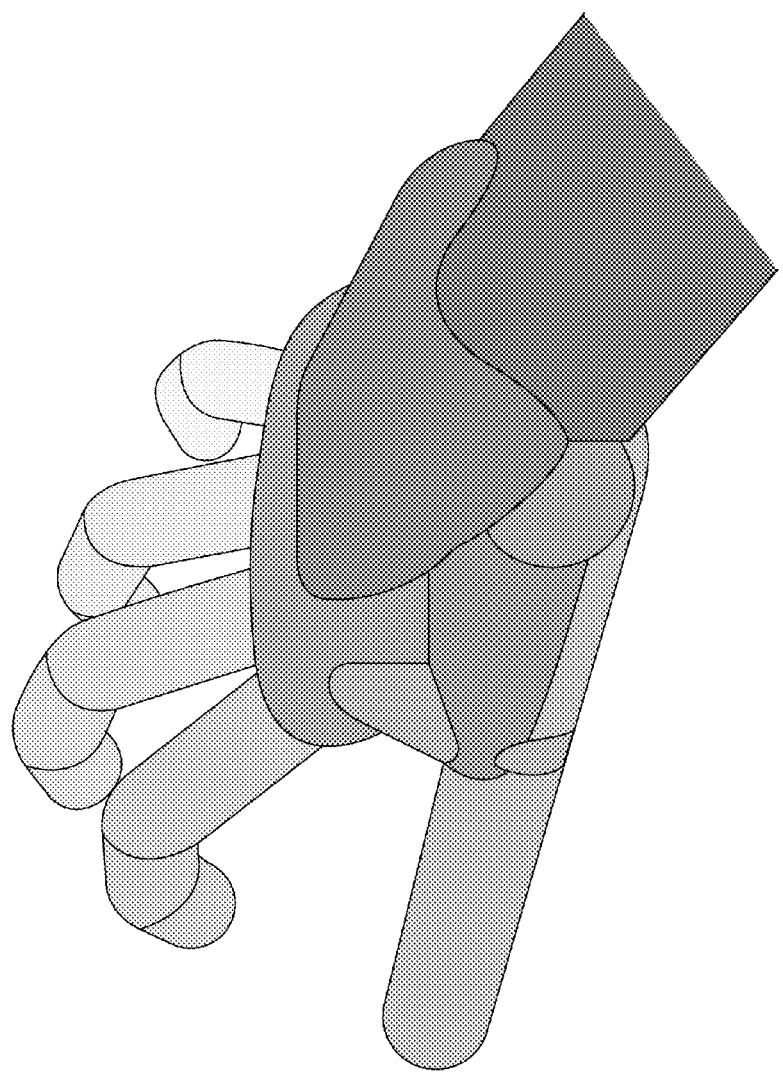

INITIALIZING PREDICTIVE INFORMATION FOR FREE SPACE GESTURE CONTROL AND COMMUNICATION

PRIORITY DATA

This application claims the benefit of U.S. Provisional Patent Application No. 61/911,975, entitled, "INITIALIZING PREDICTIVE INFORMATION FOR FREE SPACE GESTURE CONTROL AND COMMUNICATION," filed on Dec. 4, 2013. The provisional application is hereby incorporated by reference for all purposes.

INCORPORATIONS

Materials incorporated by reference in this filing include the following:

"CONTACTLESS CURSOR CONTROL USING FREE-SPACE MOTION DETECTION," U.S. Prov. App. No. 61/825,515, filed 20 May 2013, "Predictive Information for Free Space Gesture Control and Communication," U.S. Prov. App. No. 61/871,790, filed 29 Aug. 2013, "Predictive Information for Free-space Gesture Control and Communication," U.S. Prov. App. No. 61/873,758, filed 4 Sep. 2013, "PREDICTIVE INFORMATION FOR FREE SPACE GESTURE CONTROL AND COMMUNICATION," U.S. Non. Prov. application Ser. No. 14/474,077, filed 29 Aug. 2014, "VELOCITY FIELD INTERACTION FOR FREE SPACE GESTURE INTERFACE AND CONTROL," U.S. Prov. App. No. 61/891,880, filed 16 Oct. 2013, "VELOCITY FIELD INTERACTION FOR FREE SPACE GESTURE INTERFACE AND CONTROL," U.S. Non. Prov. application Ser. No. 14/516,493, filed 16 Oct. 2014, "VIRTUAL INTERACTIONS FOR MACHINE CONTROL," U.S. Prov. App. No. 61/897,186, filed 29 Oct. 2013, "VIRTUAL INTERACTIONS FOR MACHINE CONTROL," U.S. Non Prov. application Ser. No. 20/555,897, filed 29 Oct. 2014, "INTERACTIONS WITH VIRTUAL OBJECTS FOR MACHINE CONTROL," U.S. Prov. App. No. 61/898,464, filed 31 Oct. 2013, "INTERACTIONS WITH VIRTUAL OBJECTS FOR MACHINE CONTROL," U.S. Non Prov. application Ser. No. 20/580,698, filed 31 Oct. 2014, "IMPROVING PREDICTIVE INFORMATION FOR FREE SPACE GESTURE CONTROL AND COMMUNICATION," U.S. Prov. App. No. 68/898,462, filed 31 Oct. 2013, "IMPROVING PREDICTIVE INFORMATION FOR FREE SPACE GESTURE CONTROL AND COMMUNICATION," U.S. Non Prov. application Ser. No. 14/530,690, filed 31 Oct. 2014, "INTERACTION STRENGTH USING VIRTUAL OBJECTS FOR MACHINE CONTROL," U.S. Prov. application Ser. No. 17/421,923, filed 15 Nov. 2013, "INTERACTION STRENGTH USING VIRTUAL OBJECTS FOR MACHINE CONTROL," U.S. Non Prov. application Ser. No. 20/694,595, filed 13 Nov. 2014, "VEHICLE MOTION SENSORY CONTROL," U.S. Prov. App. No. 62/005,981, filed 30 May 2014, "FREE-SPACE USER INTERFACE AND CONTROL USING VIRTUAL CONSTRUCTS," U.S. Non. Prov. application Ser. No. 14/154,730, filed 20 Feb. 2014, "FREE-SPACE USER INTERFACE AND CONTROL USING VIRTUAL CONSTRUCTS," U.S. Prov. App. No. 61/873,351, filed 3 Sep. 2013, "FREE-SPACE USER INTERFACE AND CONTROL USING VIRTUAL CONSTRUCTS," U.S. Prov. App. No. 61/877,641, filed 13 Sep. 2013, "SYSTEMS AND METHODS FOR MACHINE CONTROL," U.S. Non. Prov. application Ser. No. 14/280,018, filed 16 May 2014, "DYNAMIC, FREE-SPACE USER INTERACTIONS FOR MACHINE CONTROL," U.S. Non. Prov. application Ser. No. 14/155,722, filed 1 Jan. 2014, "Systems and methods for capturing motion in three-dimensional space," U.S. Prov. App. No. 61/724,091, filed 8 Nov. 2012, "Motion capture using cross-sections of an object," U.S. application Ser. No. 13/414,485, filed 7 Mar. 2012, and "System and methods for capturing motion in three-dimensional space," U.S. application Ser. No. 13/742,953, filed 16 Jan. 2013.

TECHNICAL FIELD

Embodiments relate generally to image analysis, and in particular embodiments to identifying shapes and capturing motions of objects in three-dimensional space.

DISCUSSION

Conventional motion capture approaches rely on markers or sensors worn by the subject while executing activities and/or on the strategic placement of numerous bulky and/or complex equipment in specialized environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for improved techniques for capturing the motion of objects in real time without attaching sensors or markers thereto.

The subject matter discussed in this section should not be assumed to be prior art merely as a result of its mentioned in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

SUMMARY

Among other aspects, embodiments can provide for improved image based machine interface and/or communication by interpreting a control object's position and/or motion (including objects having one or more articulating members, i.e., humans and/or animals and/or machines). Among other aspects, embodiments can enable automatically (e.g., programmatically) initializing predictive information based upon an initialization parameter determined from characteristics of a complex control object in observed information. Automated initialization techniques obviate the need for special and often bizarre start-up rituals (place your hands on the screen at the places indicated during a full moon, and so forth) required by conventional techniques. Predictive information can comprise radial solids and/or other shapes includable in a model. Embodiments can enable conformance of the model to real world changes in a control object (i.e., object being modeled) facilitating real time or near real time control, communication and/or interaction with machines. Inputs can be interpreted from one or a sequence of images, scans, and so forth in conjunction with receiving input, commands, communications and/or other user-machine interfacing, gathering information about objects, events and/or actions existing or occurring within an area being explored, monitored, or controlled, and/or combinations thereof.

According to one aspect, a method embodiment for initializing predictive information includes receiving predictive information and observed information of an object movable in space. For example, observed information can comprise sensory information indicating a sensed presence or variance of a complex control object (hand, tool, combinations thereof) and predictive information can comprise a model defining the complex control object. An initialization parameter is determined from the observed information. The predictive information can be initialized by applying the initialization parameter to a model within the predictive information.

In an embodiment, determining an initialization parameter from the observed information comprises selecting one or more point pairings from a surface portion of the control object as represented in the observed information. A span having a span length is determined for at least one of the one or more point pairings selected. A frequency of occurrence of span lengths is determined. A span length can be selected as the initialization parameter based at least in part upon the frequency of occurrence.

In an embodiment, selecting one or more point pairings from a surface portion as represented in the observed information comprises selecting a first unmatched point on a contour representing a surface portion in the observed information. A normal is identified at the first unmatched point. A closest second unmatched point reachable by a convex curve (line) having the most opposite normal is then found. Identifying a normal at the first unmatched point can comprise determining a set of points proximate to the first unmatched point and determining a normal for the first unmatched point using the other points in the set.

In an embodiment, determining a span having a span length for at least one of the one or more point pairings selected comprises determining a shortest convex curve passing through each point of the point pairing. The curve is then checked to determine that the curve fails to pass through other points of model. Provided that the curve does not pass through other points of the model, the curve is provided as the span. Spans may possess horizontally disposed component(s), vertically disposed component(s) and/or combinations thereof.

In an embodiment, determining a frequency of occurrence of span lengths comprises smoothing a discrete relationship comprising discrete point pairings to a continuous curve. In an embodiment, determining a frequency of occurrence of span lengths comprises fitting one or more radial basis functions (i.e., a real-valued function whose value depends only on the distance from the origin) to the observed span lengths. A function is applied to the one or more radial basis functions to form a result. The result comprising the frequency of occurrence of span lengths may be provided.

In an embodiment, fitting one or more radial basis functions to the observed span length comprises selecting for one or more observed span length values a radial basis function and determining at least one property of the radial basis function selected. For example, determining at least one property of the radial basis function selected can comprise determining a variance of a dataset including the span lengths. The variance can be divided by an expectation value determined from an expected number of modes in the dataset determined from the observed information. The variance divided by the expectation value can be provided as a width of the radial basis function.

In an embodiment, applying a function to the one or more radial basis functions comprises applying a summation function to sum the radial basis functions thereby producing a frequency of occurrence for the span lengths.

In an embodiment, selecting a span length as the initialization parameter based at least in part upon the frequency of occurrence comprises determining one or more modes from the frequency of occurrence of the observed span lengths. A mode of interest is selected. The initialization parameter can be determined from the mode of interest.

In an embodiment, applying the initialization parameter to at least a portion of a model within the predictive information to initialize the model portion comprises scaling span lengths computed for the model portion by the initialization parameter. In another embodiment, applying the initialization parameter to at least a portion of a model within the predictive information to initialize the model portion comprises selecting a model portion based at least in part upon the initialization parameter. For example, a model portion representative of a cat's paw or an adult's hand, a tool tip, or the like can be selected. In a yet further embodiment, applying the initialization parameter to at least a portion of a model within the predictive information to initialize the model portion comprises communicating control information to a machine sensory control system. For example control information indicating changing power consumption profiles based on size of observed object. In embodiments, the initialization parameter can be applied to at least a portion of a 3D model within the predictive information.

According to another aspect, a non-transitory machine readable medium is provided for storing one or more instructions which when executed by one or more processors cause the one or more processors to perform actions comprising receiving predictive information and observed information of an object movable in space; determining an initialization parameter from the observed information; and applying the initialization parameter to at least a portion of a model within the predictive information; thereby initializing the model portion.

According to a yet further aspect, a system is provided that comprises a detection system to capture sensory information about a complex control object and a variation determination system coupled to the detection system. The variation determination system is configured to receive predictive information and observed information of an object movable in space; determine an initialization parameter from the observed information; and apply the initialization parameter to at least a portion of a model within the predictive information; thereby initializing the model portion.

Advantageously, some embodiments can enable quicker, crisper gesture based or "free space" (i.e., not requiring physical contact) interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen. Some embodiments can provide for improved interface with computing and/or other machinery than would be possible with heretofore known techniques. In some embodiments, a richer human-machine interface experience can be provided.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIGS. 2A-2C illustrate different views of a 3D capsule hand according to one implementation of the technology disclosed.

DETAILED DESCRIPTION

Among other aspects, embodiments described herein with reference to example implementations can provide for automatically (e.g., programmatically) initializing predictive information based upon an initialization parameter determined from characteristics of a complex control object in observed information. Predictive information can comprise radial solids and/or other shapes includable in a model. Embodiments can enable automated initialization of the model to reflect real world changes in a complex control or other detectable object (i.e., object being modeled) facilitating real time or near real time control, communication and/or interaction with machines.

Figure 1A:
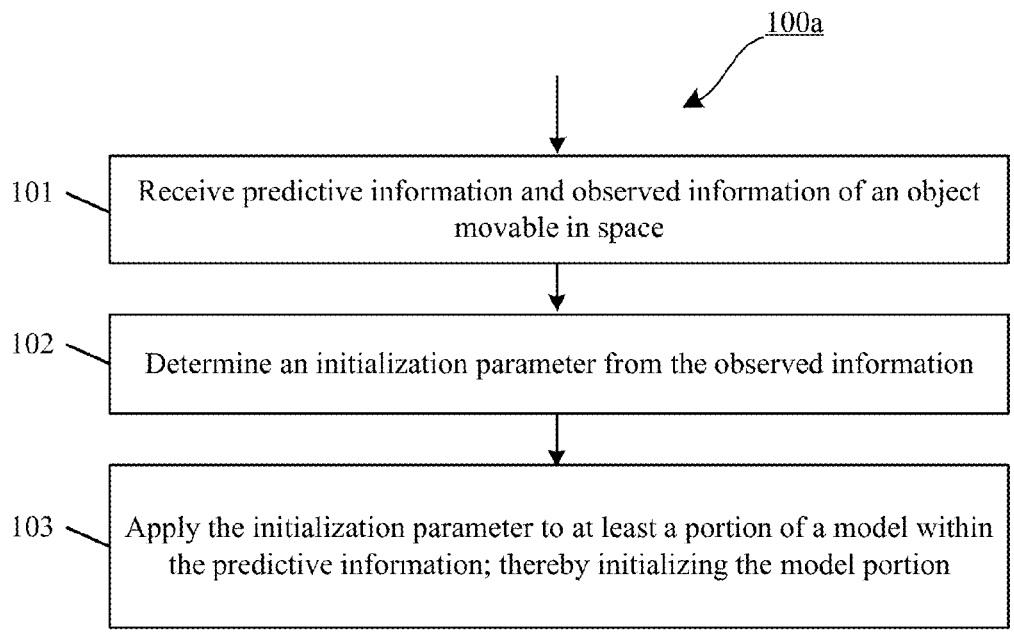
FIGS. 1A-1N illustrate flowcharts of processes for determining when sensory input interacts with virtual objects according to an embodiment.
Figure 1B:
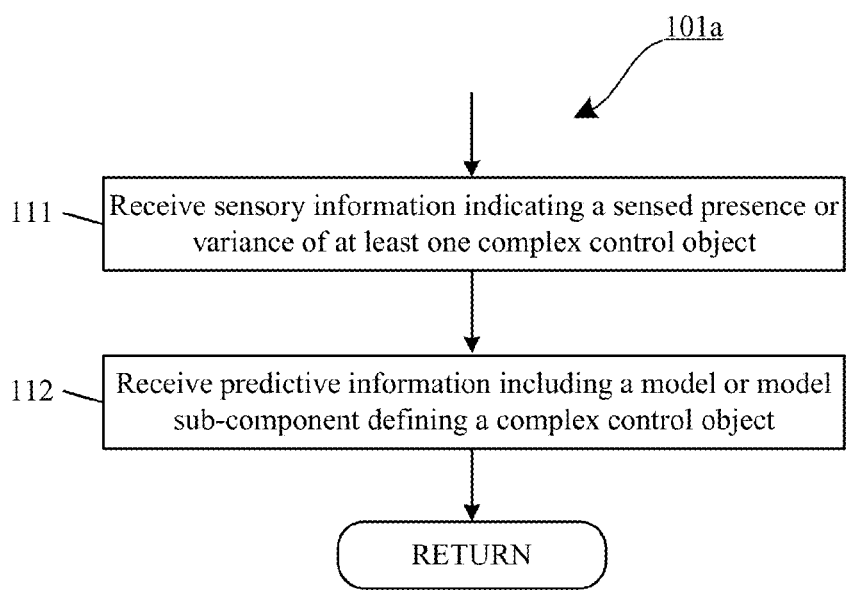
Figure 1C:
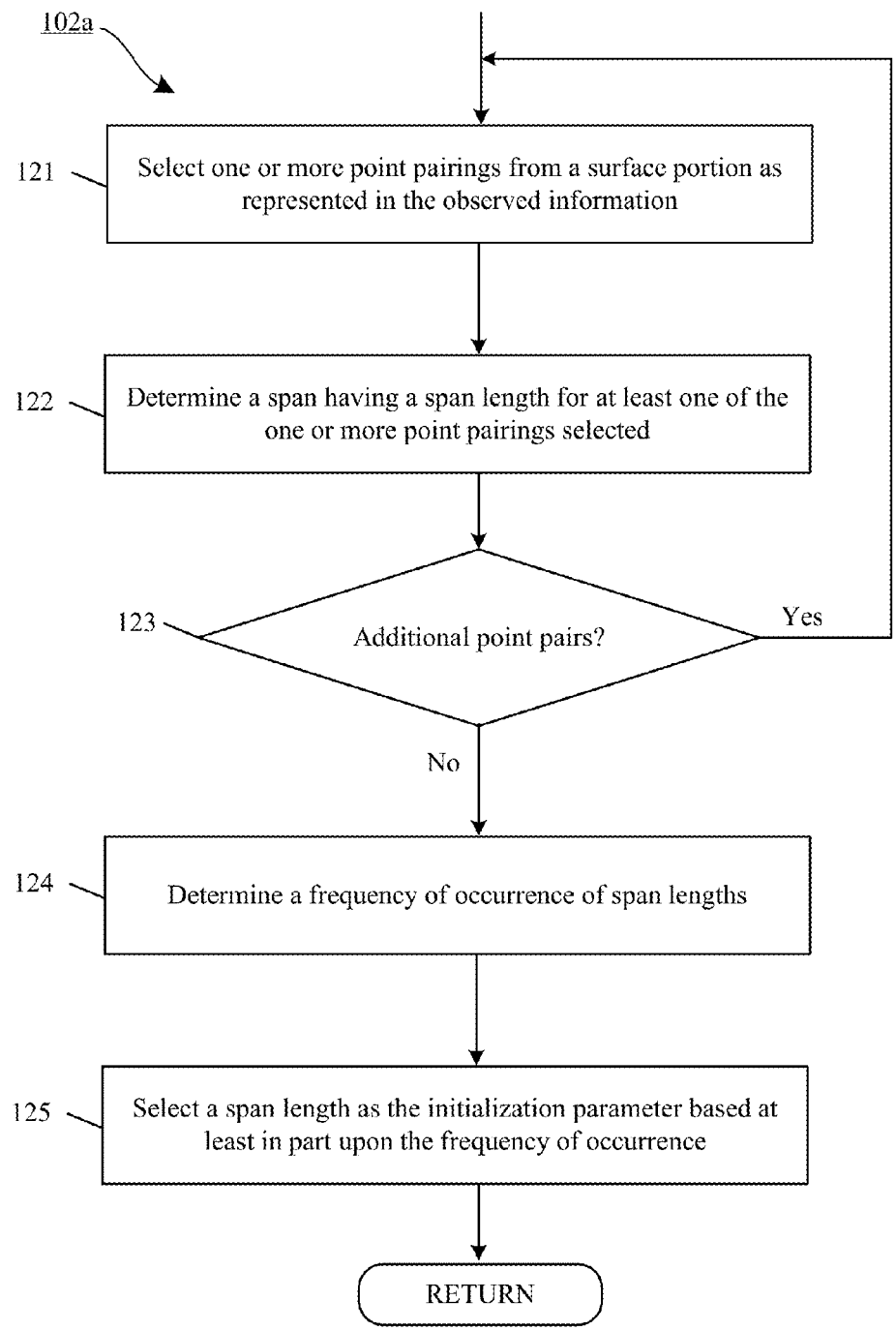
Figure 1D:
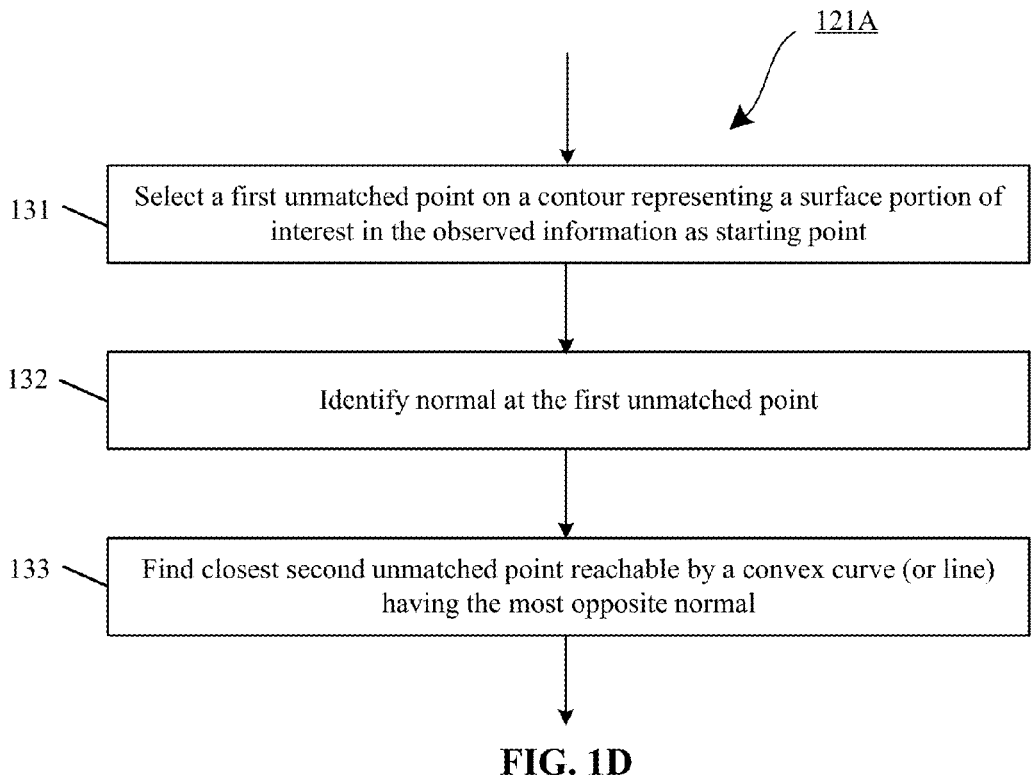
Figure 1E:
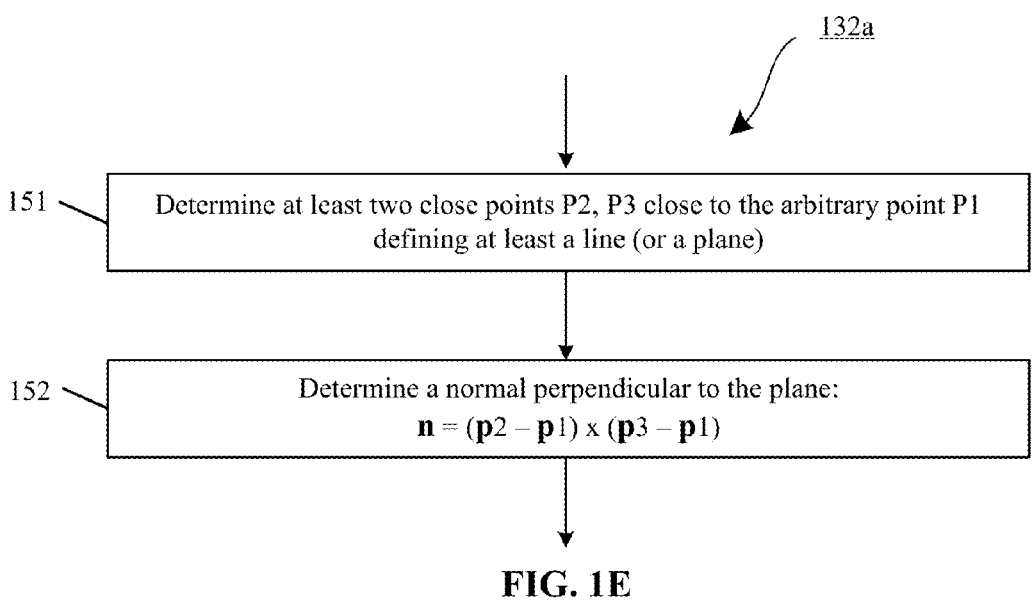
Figure 1F:
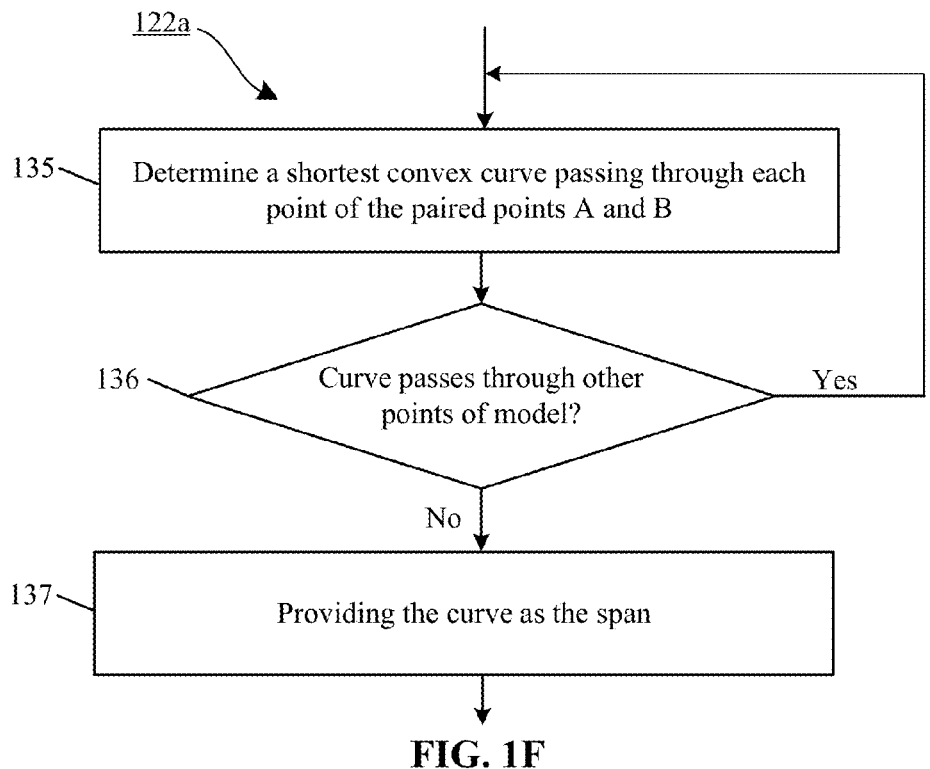
Figure 1G:
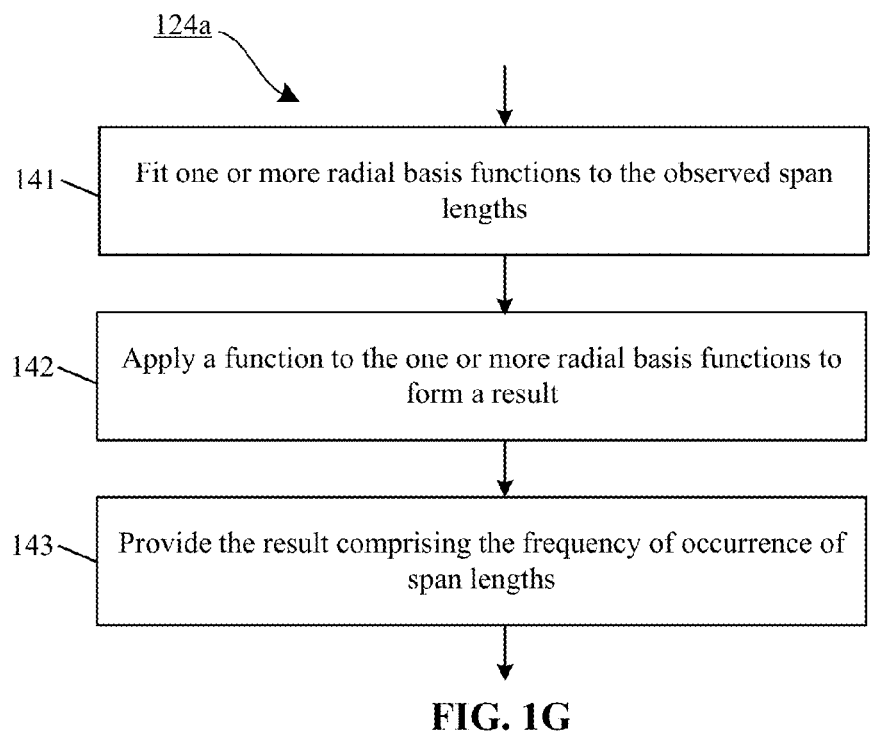
Figure 1H:
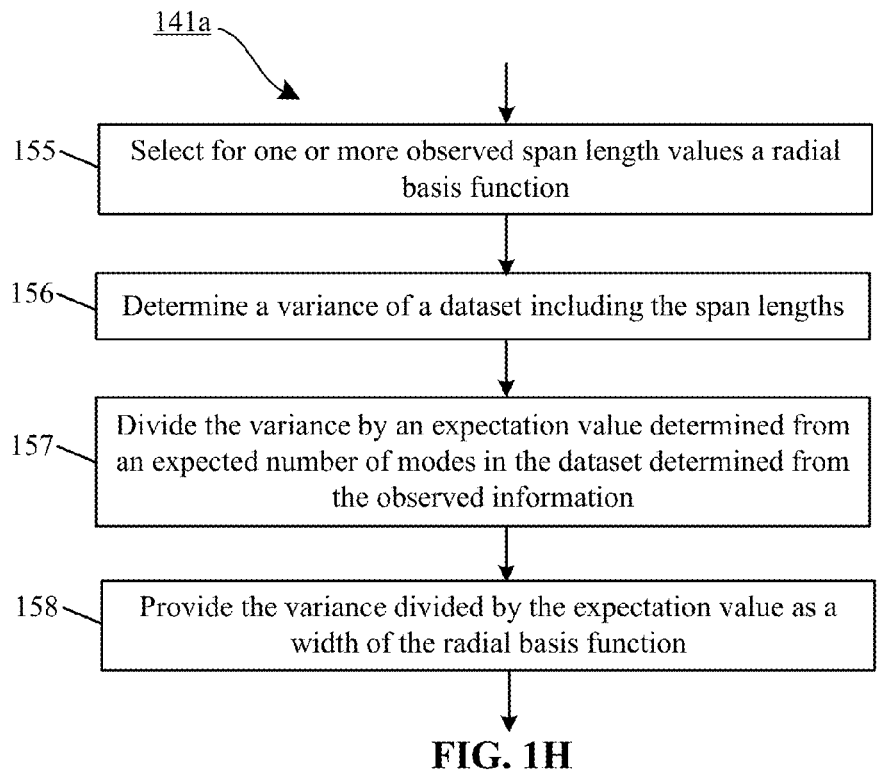
Figure 1I:
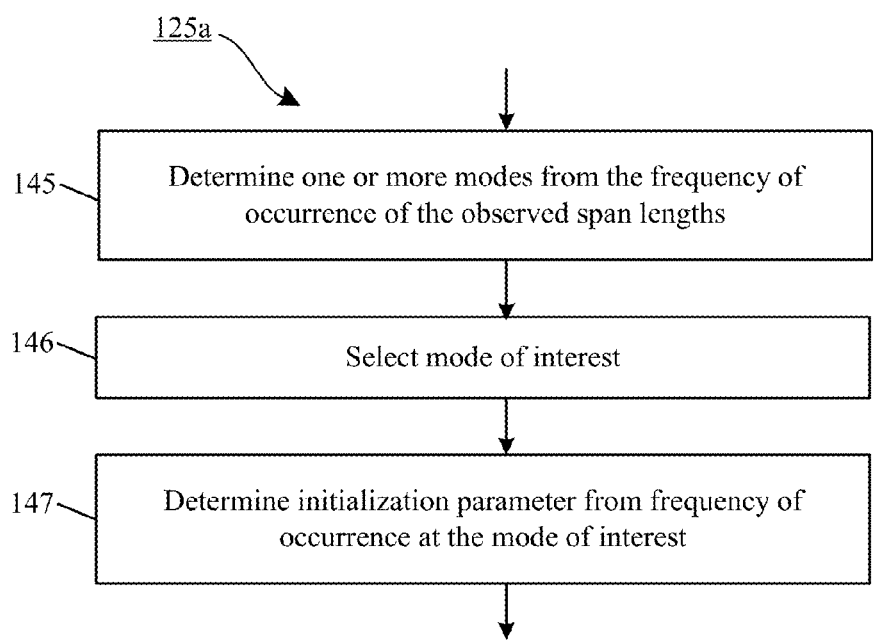
Figure 1J:
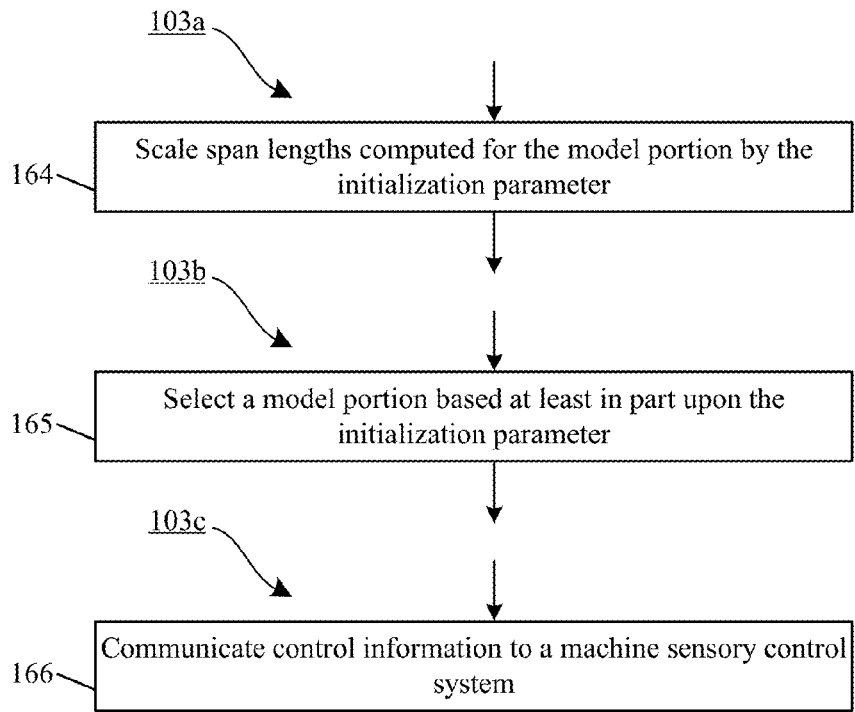
Figure 1K:
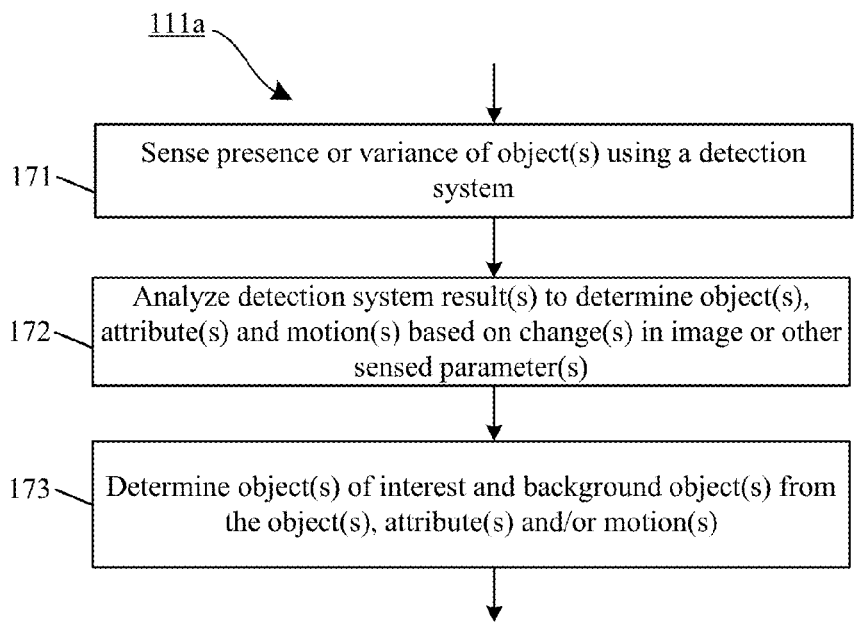
Figure 1L:
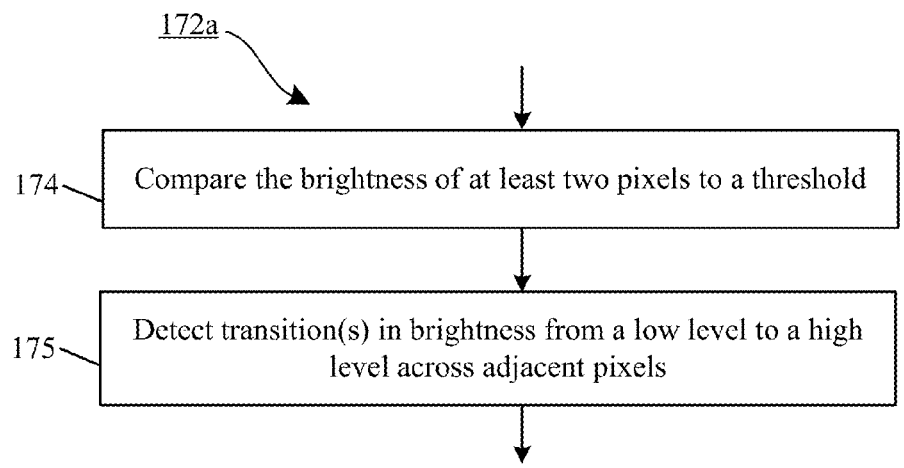
Figure 1M:
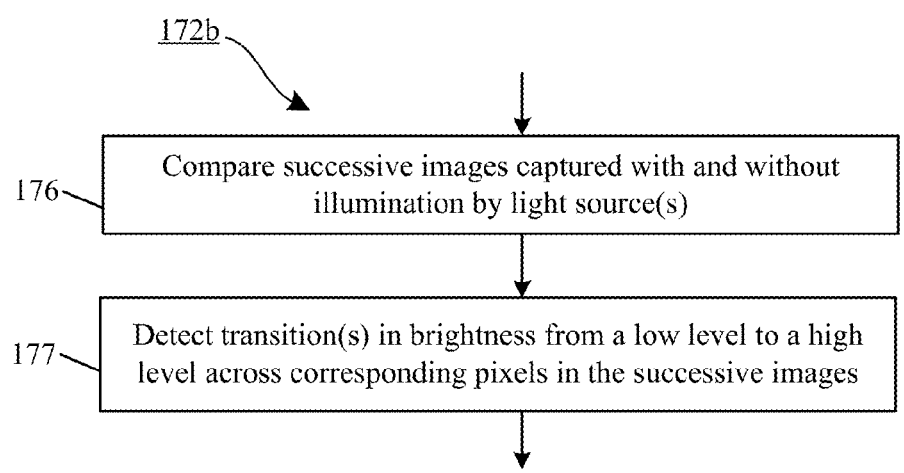
Figure 1N:
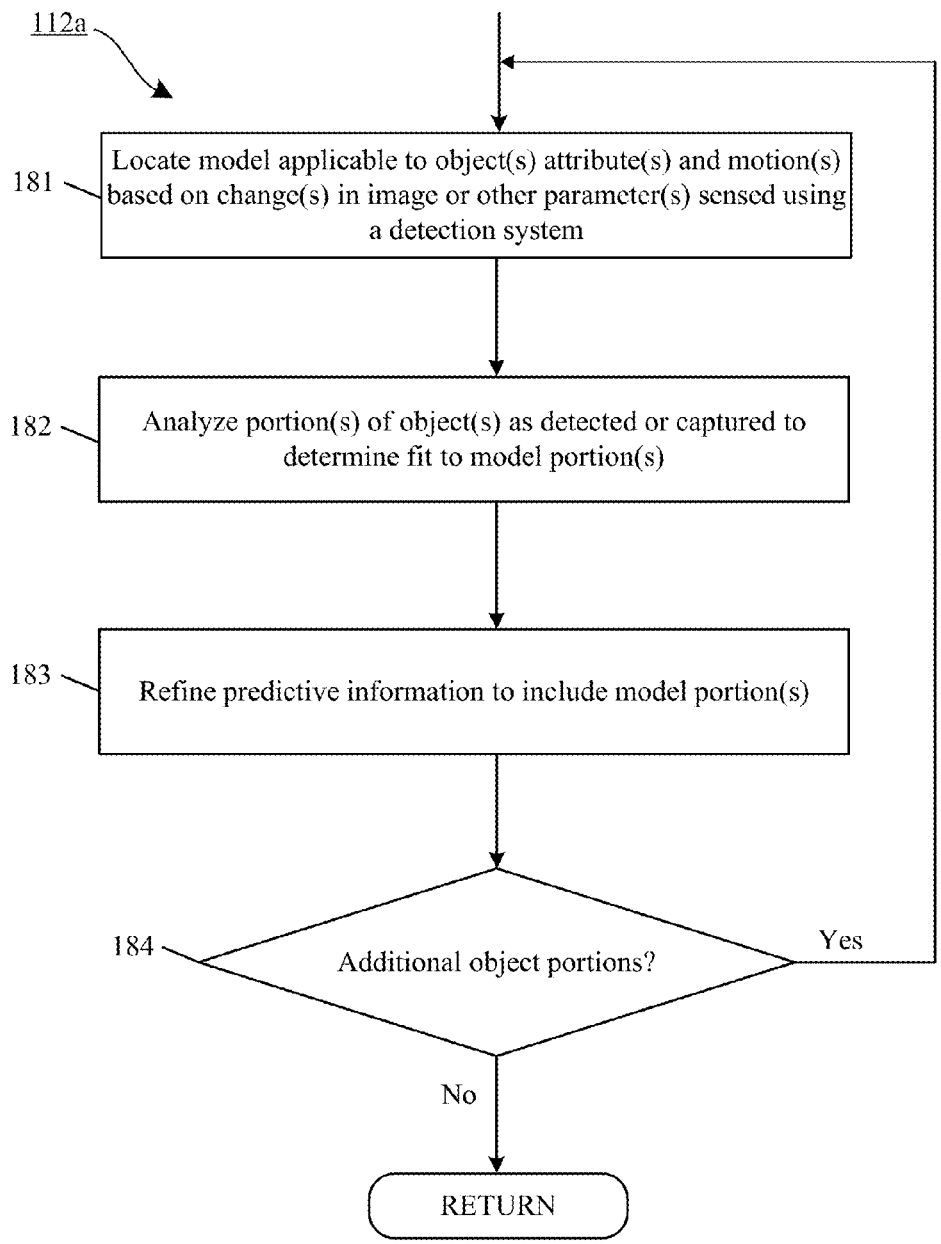
Figure 2A:
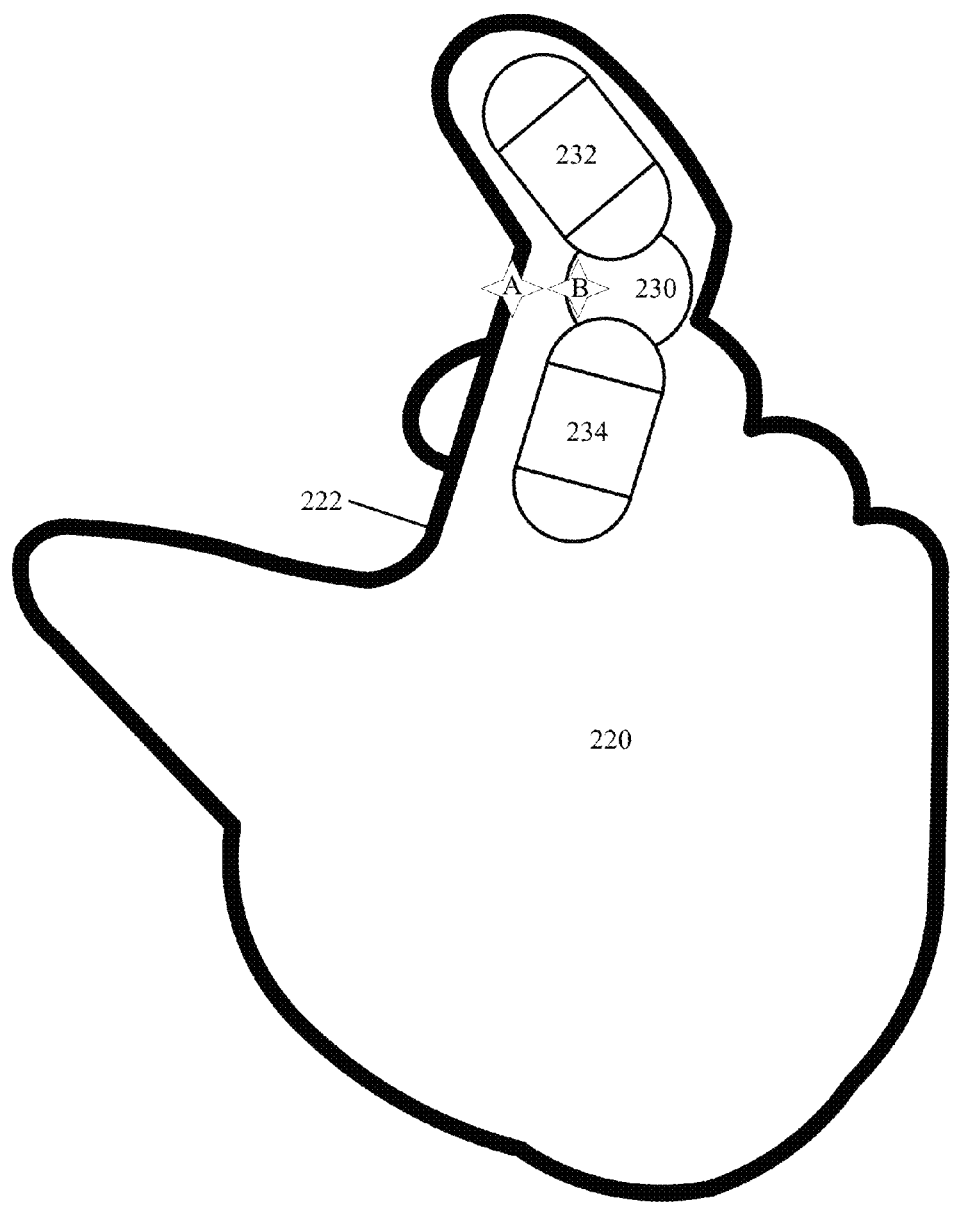
Figure 2C:
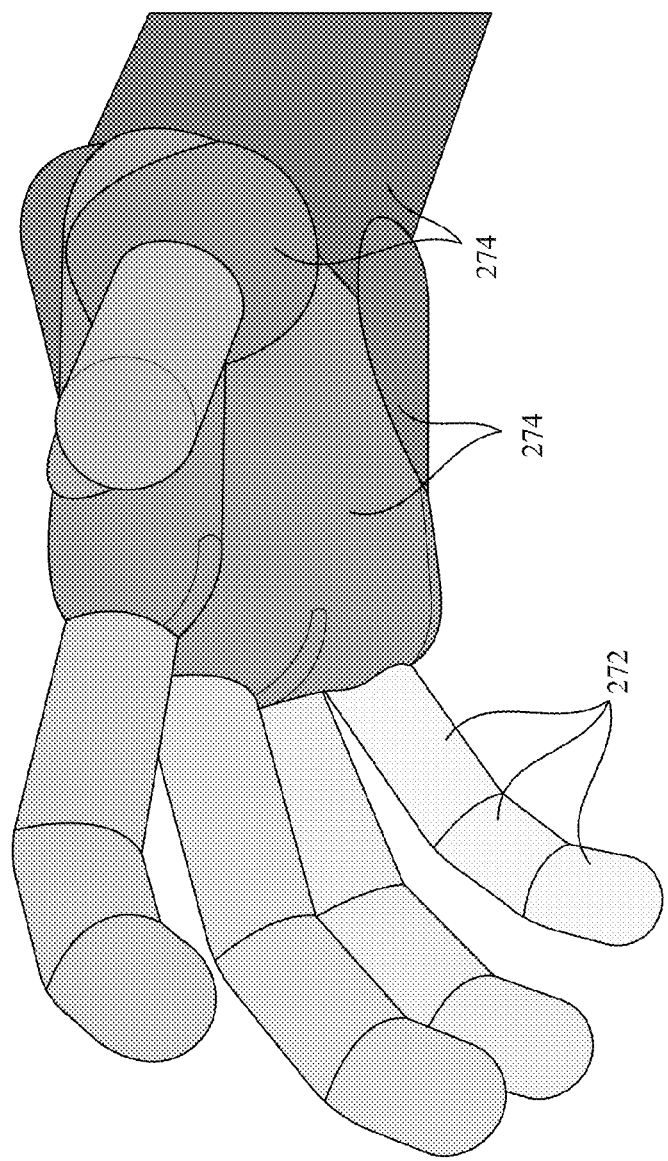

FIGS. 1A-1N illustrate flowcharts of processes for initializing predictive information based upon an initialization parameter determined from characteristics of observed information according to an embodiment. As shown in FIG. 1A, a process 100a, operatively disposed in predictive information discriminator 1013 and carried out upon one or more computing devices in system 1000 of FIG. 10, determines initialized predictive information based upon an initialization parameter determined from characteristics of observed information. In a block 101, predictive information and observed information of an object movable in space is received. The object can be a portion of a complex control object such as a hand or other detectable object in a region of space, for example. A detectable object is one that is not completely translucent to electromagnetic radiation (including light) at a working wavelength. Common detectable objects useful in various embodiments include without limitation a brush, pen or pencil, eraser, stylus, paintbrush and/or other virtualized tool and/or combinations thereof. Objects can be detected, and observed information can be determined, in a variety of ways, but in an embodiment and by way of example, one method for detecting objects is described below with reference to flowchart 101 of FIG. 1A.

As shown by flowchart 101a depicted by FIG. 1B, in a block 111 sensory information indicating a sensed presence or variance of at least one complex control object is received. Sensory information can be received from a detection system, such as provided by detection system 90A of FIG. 7, recorded image(s) of an imaging system, computer generated virtual image(s), and/or combinations thereof. In a block 112 of FIG. 1B predictive information defining a complex control object is received. The predictive information can comprise a model or model sub-component—i.e., one selected to be appropriate to the complex control object—from object library 197A of FIG. 8, for example, or received from another program or source. Predictive information including a model that corresponds to the portion of the hand or other detectable object can be determined in a variety of ways. In an embodiment and by way of example, one technique for determining predictive information including a model corresponding to the portion of the hand or other detectable object is described below with reference to flowchart 112a of FIG. 1N and FIGS. 8-1, 8-2. Other modeling techniques (e.g., skeletal models, visual hulls, surface reconstructions, other types of virtual surface or volume reconstruction techniques, or combinations thereof) can be used in other embodiments as will be readily apparent to one skilled in the art.

Figure 3:
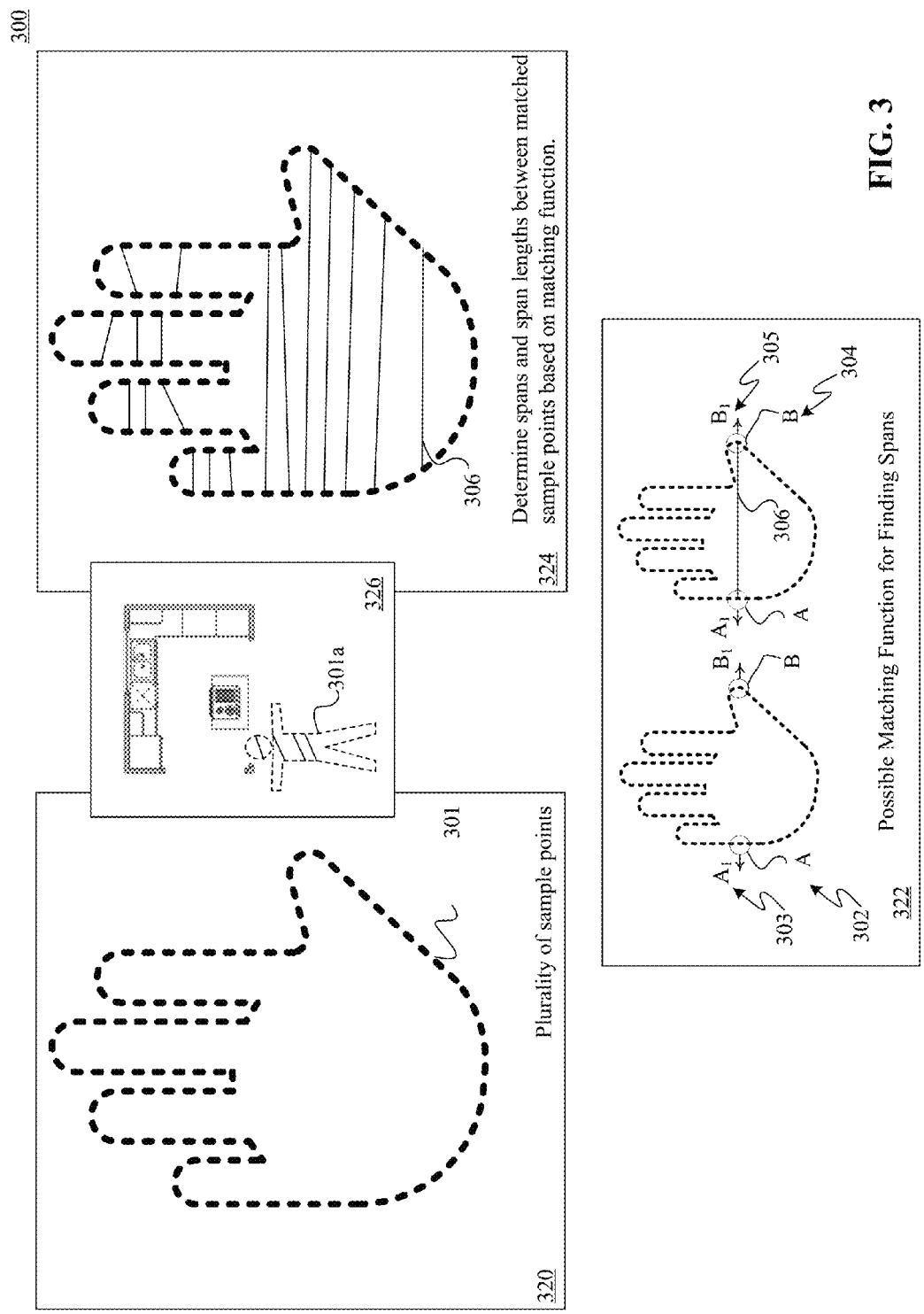
FIG. 3 is one implementation of determining spans and span lengths of a control object.
Figure 4:
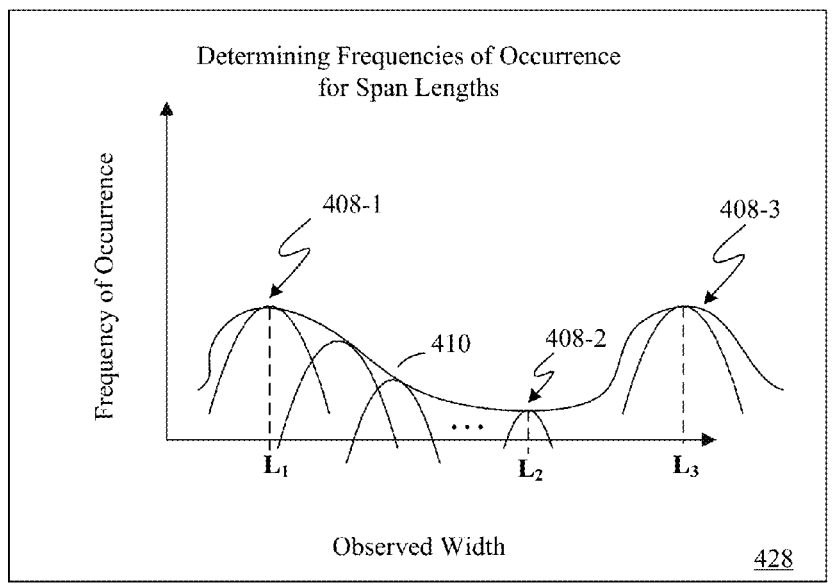
FIG. 4 illustrates a representative prediction model based on frequency distributions according to embodiments.
Figure 4:
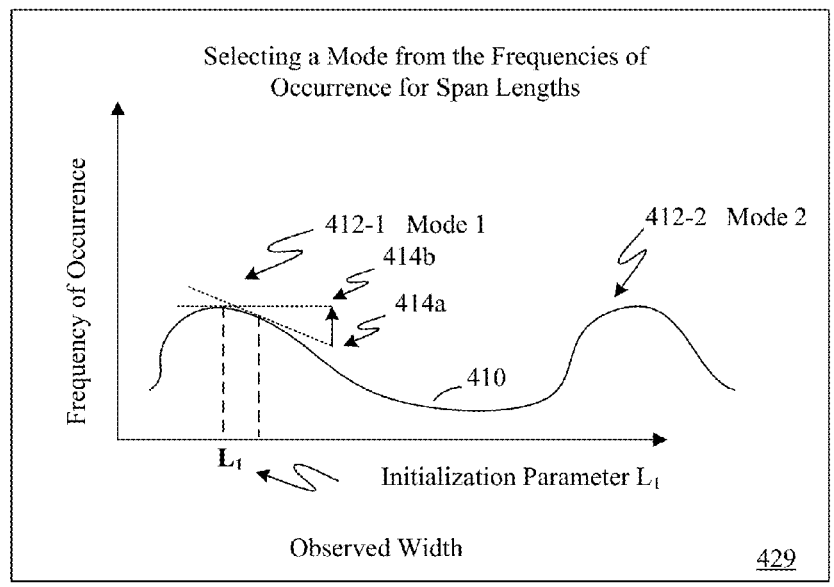
Figure 5:
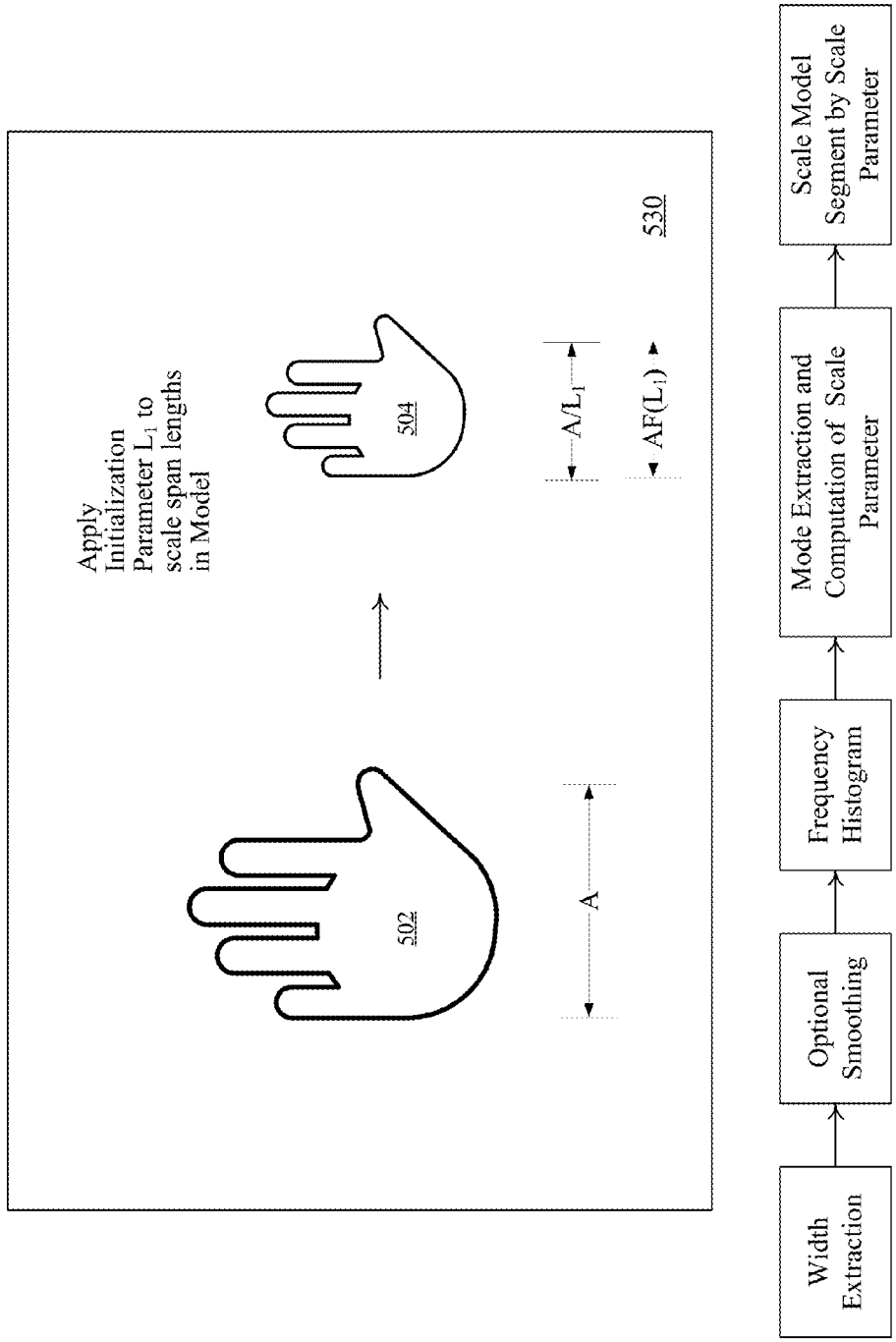
FIG. 5 illustrates how predictive information can be scaled using the initialization parameter according to an embodiment.
Figure 6A:
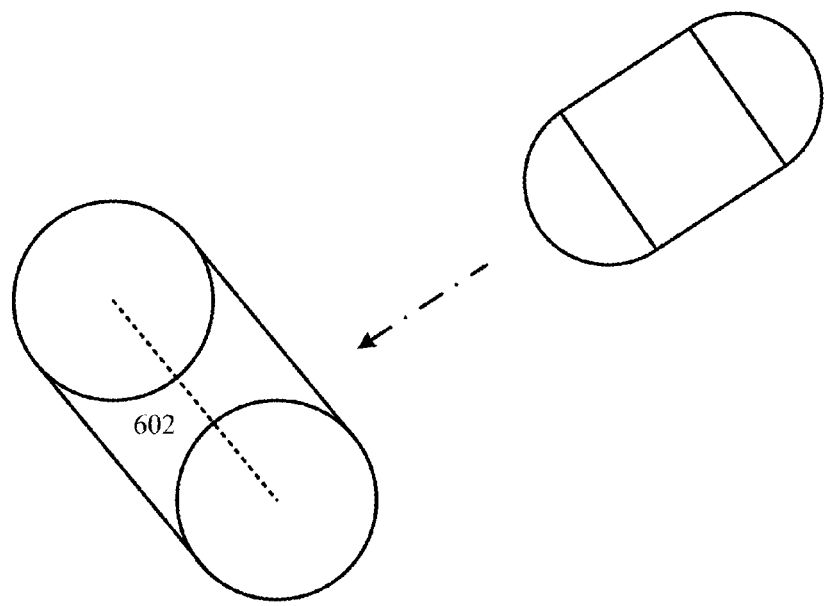
FIGS. 6A and 6B are simplified illustrations of fitting one or more 3D solid subcomponents to the observation information according to an implementation.
Figure 6B:
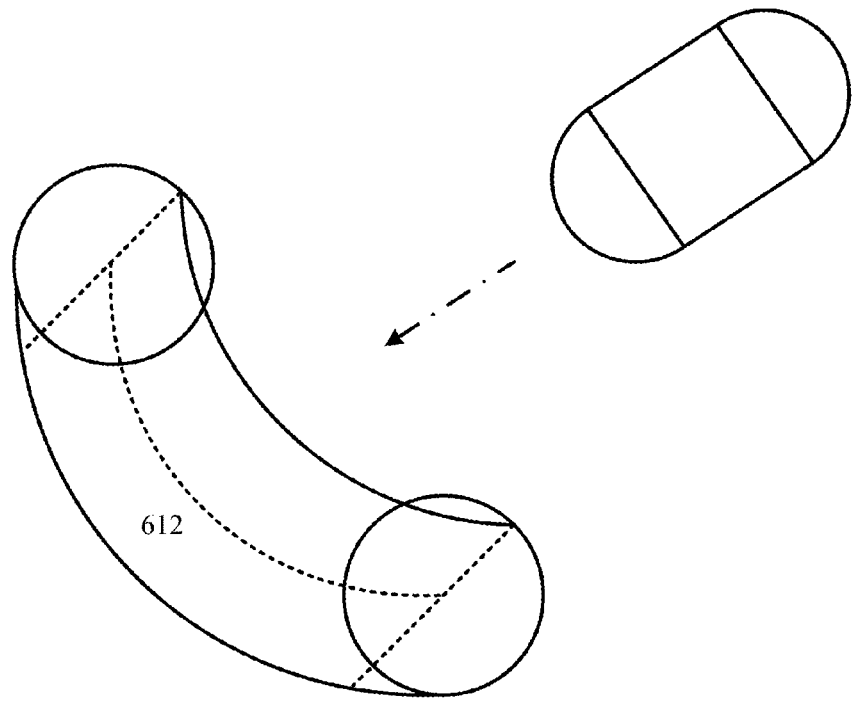

In a block 102 of FIG. 1A, an initialization parameter is determined from the observed information. In an embodiment and by way of example, one method for determining the initialization parameter is described below with reference to flowchart 102a of FIG. 1C and FIGS. 3, 4 and 5. FIGS. 4 & 5 depict determining spans and span lengths in the observed information according to an embodiment. As shown by the flowchart of FIG. 1C, a method 102a includes block 121 in which one or more point pairings are selected from a surface portion as represented in the observed information. As illustrated by block 320 of FIG. 3, an observed surface portion 301 (i.e., of observed information) can comprise a plurality of sample points from which one or more point pairings can be selected. In a block 322 of FIG. 3, a point pairing between point A and point B of observed surface portion 301 are selected by application of a matching function such as for example the matching function. One method for determining a point pairing using a matching function is illustrated by flowchart 121a of FIG. 1D, and FIG. 3, includes a block 131 of FIG. 1D in which a first unmatched (arbitrary) point A on a contour (of block 322 of FIG. 3) representing a surface portion of interest in the observed information is selected as a starting point 302. In a block 132 of FIG. 1D, a normal $A_1$ 303 (of block 322 of FIG. 3) is determined for the point A. A wide variety of techniques for determining a normal can be used in embodiments, but in one exemplary embodiment illustrated by the flowchart 132a of FIG. 1E, in a block 151, a set of points proximate to the first unmatched point, at least two of which are not co-linear, is determined. Then, in a block 152, a normal for the first unmatched point can be determined using the other points in the set by determining a normal perpendicular to the plane. For example, given points $P_1$, $P_2$, $P_3$, the normal n is given by the cross product:

$$n=(p_2-p_1)\times(p_3-p_1),$$

Another technique that can be used: (i) start with the set of points; (ii) form a first vector from $P_2-P_1$, (iii) apply rotation matrix to rotate the first vector 90 degrees away from the center of mass of the set of points. (The center of mass of the set of points can be determined by an average of the points). A yet further technique that can be used includes: (i) determine a first vector tangent to a point on a contour in a first image; (ii) determine from the point on the contour a second vector from that point to a virtual camera object in space; (iii) determine a cross product of the first vector and the second vector. The cross product is a normal vector to the contour.

Again with reference to FIG. 1D, in block 133 of FIG. 1D, the closest second unmatched point B 304 (of block 322 of FIG. 3) reachable by a convex curve (line 306) having the most opposite normal $B_1$ 305 is found. Accordingly, points A and B form a point pairing. As illustrated by block 326 of FIG. 3, the object need not be a hand (nor for that matter, even a portion of a human being).

Again with reference to FIG. 1C, in a block 122, a span length is determined for at least one of the one or more point pairings selected in block 121. Now with reference to block 324 of FIG. 3 and flowchart 122a depicted in FIG. 1F, one or more spans and span lengths are determined for the one or more point pairings. In a representative embodiment illustrated by flowchart 122a, in block 135, a span can be found by determining a shortest convex curve for the point pairings A and B. In a block 136, it is determined whether the convex curve passes through any other points of the model. If so, then in block 135, another convex curve is determined for paired points A and B. Otherwise, in block 137, the span comprises the shortest continuous segment found through paired points A and B that only intersects the model surface at paired points A and B. In an embodiment, the span can comprise a convex geodesic segment that only intersects the model at two points. A span can be determined from any two points using the equation of a line fitted to the paired points A and B for example.

Again with reference to FIG. 1C, in a block 123, a check whether there are any further points to process is made. If there are further point pairs to process, then flow continues with block 121 to process the next pair. Otherwise, in a block 124, frequencies of occurrence are determined for the various span lengths, establishing a frequency distribution. One way to determine frequency of occurrence illustrated by block 428 of FIG. 4 and flowchart 124a of FIG. 1G includes a block 141 in which one or more radial basis functions 408-1, 408-2, and 408-3 are fit to the observed span lengths L1, L2 and L3. For example, a radial basis function (Gaussian or approximation thereof) can be selected for one or more observed span length values using techniques described below with reference to FIG. 1H. In a block 142 of FIG. 1G, a function appropriate to the implementation is applied to the radial basis functions to provide a frequency of occurrence for the span lengths. For example, in block 428 of FIG. 4, the radial basis functions 408-1, 408-2, and 408-3 are summed to arrive at a frequency of occurrence wave 410 for the observed span lengths. (A "wave" denoting a continuous function.) Of course, in embodiments, other functions (multiplication, averaging, interpolation, and so forth and/or combinations thereof depending upon the implementation specific requirements or desirability) can be applied to the radial basis functions to arrive at a frequency of occurrence. Now, in a block 143 in FIG. 1G, the result of applying the function to the one or more radial basis functions is provided. In an embodiment, smoothing techniques (interpolation, Gaussian, bucketing, rounding, others, combinations thereof) can be applied to a discrete relationship comprising discrete point pairings to form a continuous curve.

Parameters for the radial basis functions, i.e., width of the function for example, can be selected using a variety of techniques. One technique for determining a width of a radial basis function illustrated by flowchart 141a of FIG. 1H in which a block 155 includes selecting for one or more observed span length values a radial basis function, having one or more properties, which can be determined. For example, in a block 156, a variance of the dataset including the observed span lengths is determined. In a block 157, the variance is divided by an expectation value. Expectation values can be determined from an expected number of modes in the dataset determined from the span lengths in the observed information. For example, using horizontally disposed spans, as illustrated by FIG. 3, observed span lengths of a hand and arm can be sorted into approximately four expected expectation values: one value corresponding to an approximate cross finger diameter length; one value corresponding to a cross the palm length; one value corresponding to a span across the palm to the thumb; and one value corresponding to a cross the wrist length. A face can be sorted into one value. An automobile (observed from its side) can be sorted into three values, one for the cabin, windshield to rear window; one from the front bumper to the rear bumper; and one from the front of the tire to the rear of the tire. In a block 158, the variance divided by the expectation value is provided as a width of the radial basis function.

Other techniques for determining frequencies of occurrence for the various span lengths that can be used in embodiments include bucketing—in which buckets of fixed or variable width are assigned to one or more discrete points representing span length occurrences within some range corresponding to the bucket width. The frequency of occurrences for each bucket can be combined (e.g., interpolation, summed, weighted, smoothed or other combinations, and/or combinations thereof) to produce a frequency of occurrence function.

Now again with reference to FIG. 1C, in a block 125, a span length is selected as the initialization parameter based upon the frequency of occurrence. Using one or a different technique described above with reference to block 124, an initialization parameter can be determined using a technique for performing mode selection on the frequencies of occurrence for the bucketed span lengths. One technique is mode selection, illustrated with reference to flowchart 125a of FIG. 11 and FIG. 4 that includes a block 145 in which one or more modes are determined from the frequencies of occurrence of observed span lengths. For example, in one technique illustrated with reference to block 429 of FIG. 4, mode 1 (412-1) and mode 2 (412-2) are defined by locations on the frequency occurrence wave 410 in which there exists a local minima or maxima. Accordingly, one technique for determining modes from the frequencies of occurrence comprises finding minima or maxima of the frequency of occurrence wave 410 produced in step 124. In a block 146 a mode of interest is selected. A mode of interest can be for example a mode having a most frequently occurring span length.

One technique for determining minima or maxima indicating modes in block 145 comprises employing a gradient descent technique. With reference to block 429 of FIG. 4, a gradient can be determined (i.e., by taking a derivative 414a, 414b of a function representing a frequency of occurrence or frequency distribution, sometimes shortened to distribution (for example frequency occurrence wave 410 determined above with reference to block 124)). One or more minima 414b of the derivative 414 of the function can be determined to indicate a mode of interest. For example, one technique applies Rolle's Theorem to determine a minima (or maxima) at a point in the frequency occurrence wave 410 along some closed interval demarcated by two points on the curve having the same function value. In a block 147, an initialization parameter is determined from the mode of interest. For example, again with reference to block 429 of FIG. 4, a span length $L_1$ corresponding to mode 1 (412-1) is selected as the initialization parameter.

A yet further technique, properties of the frequency of occurrence other than mode can be used to determine an initialization parameter. For example, expected value of frequency of occurrence, appearance of the number of modes, spacing between modes, other properties, and/or combinations thereof can be used to determine initialization parameters. In an embodiment, the procedure illustrated in FIG. 1C completes and returns a most frequently occurring span length as an initialization parameter. In an alternative embodiment, a least frequently occurring span length ($L_2$ in block 428 of FIG. 4) can be returned as the initialization parameter.

In a block 103 of FIG. 1A, the initialization parameter is applied to at least a portion of a model within the predictive information. Application of the initialization parameter can be used to initialize the model portion using a variety of techniques-scaling, weighting, specifying (or computing) confidence factors, selecting model portions, and mode (child's hand, cat's paw, tool tip, and so forth) selection. For example and with reference to block 164 of flowchart 103a of FIG. 1J and block 530 of FIG. 5, span length(s) of one or more portion of a model 502 in the predictive information can be scaled using the initialization parameter $L_1$ as a scaling factor to produce an initialized model 504. In embodiments, scaling can include multiplying (or dividing) the span length(s) by the scaling factor. In other implementations, the scaling factor can be applied according to a function based on the scaling factor, for example, a function $F(L_1)$ that determines based at least in part upon the initialization parameter, that a model portion is too large (or small) can be used to exclude (or alter the weighting or confidence factor) for that portion in the model. In yet further embodiments, the span length(s) can be scaled according to the scaling factor and one or more quantifiable characteristics determined from imaging the object (i.e., brightness, frequencies, and so forth). In a further embodiment, with reference to block 165 of flowchart 103b of FIG. 1J, a model portion is selected based at least in part upon the initialization parameter. For example, an initialization parameter can be used to select from models for adult hands, children's hands, animal paws, tool tips, and so forth. In yet further embodiments, with reference to block 166 of flowchart 103c of FIG. 1J, initialization parameters can be used to communicate control information to the MSCS, for example, changing power consumption profiles based on size of observed object(s), changing frame rates, selecting user modes in software (tool, hand, face discrimination), background elimination, noise elimination.

In an embodiment and by way of example, FIG. 1K illustrates a flowchart 111a of one technique for detecting objects. Of course, objects can be detected in a variety of ways, and the method of flowchart 111a is illustrative rather than limiting. In a block 171, presence or variance of object(s) can be sensed using a detection system 90A (see e.g., FIGS. 7-8 below). In a block 172, detection system results are analyzed to detect objects, object attributes, motions, and so forth based on changes in image or other sensed parameters (e.g., brightness, and so forth). A variety of analysis methodologies suitable for providing object attribute and/or feature detection based upon sensed parameters can be employed in embodiments. Some example analysis embodiments are discussed below with reference to FIGS. 1L-1M. At block 173 in FIG. 1K, object(s) of interest and background object(s) can be determined using a feature detection algorithms, motion capture algorithms or other methodologies, or combinations thereof. One example of an appropriate feature detection algorithm can be any of the tangent-based algorithms described in co-pending U.S. Ser. No. 13/414,485, filed Mar. 7, 2012, and Ser. No. 13/742,953, filed Jan. 16, 2013; however, other algorithms (e.g., edge detection, axial detection, surface detection techniques, and so forth) can also be used in some embodiments.

Image analysis can be achieved by various algorithms and/or mechanisms. For example, FIG. 1L illustrates a flowchart 172a of one method for detecting edges or other features of object(s). This analysis embodiment can include a block 174, in which the brightness of two or more pixels is compared to a threshold. In a block 175, transition(s) in brightness from a low level to a high level across adjacent pixels are detected. In another example, FIG. 1M illustrates a flowchart 172b of an alternative method for detecting edges or other features of object(s), including a block 176 of comparing successive images captured with and without illumination by light source(s). In a block 177, transition(s) in brightness from a low level to a high level across corresponding pixels in the successive images are detected.

Figure 7:
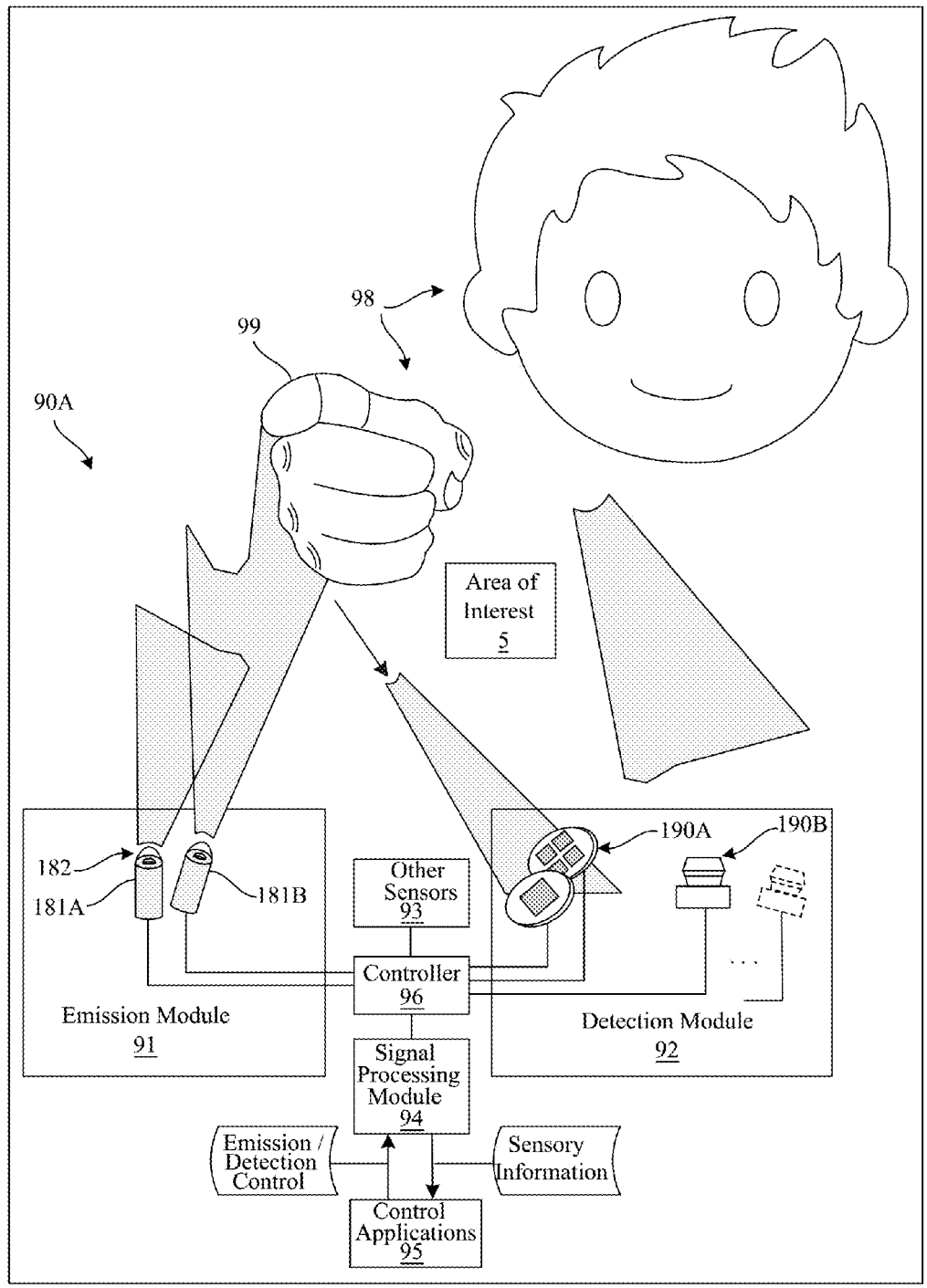
FIGS. 7-8 illustrate an exemplary machine sensory and control system including a model of a control object in embodiments.
Figures 1, 7:
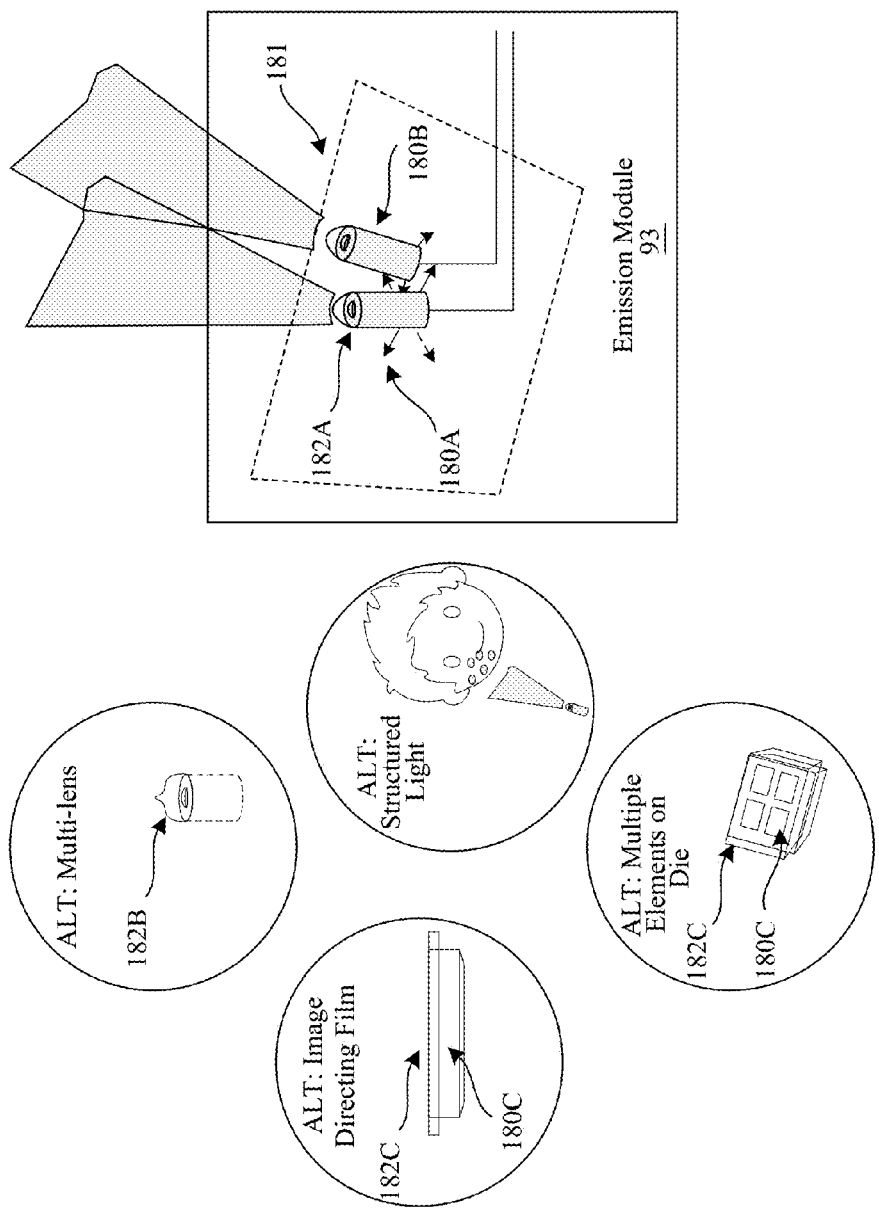
Figures 2, 7:
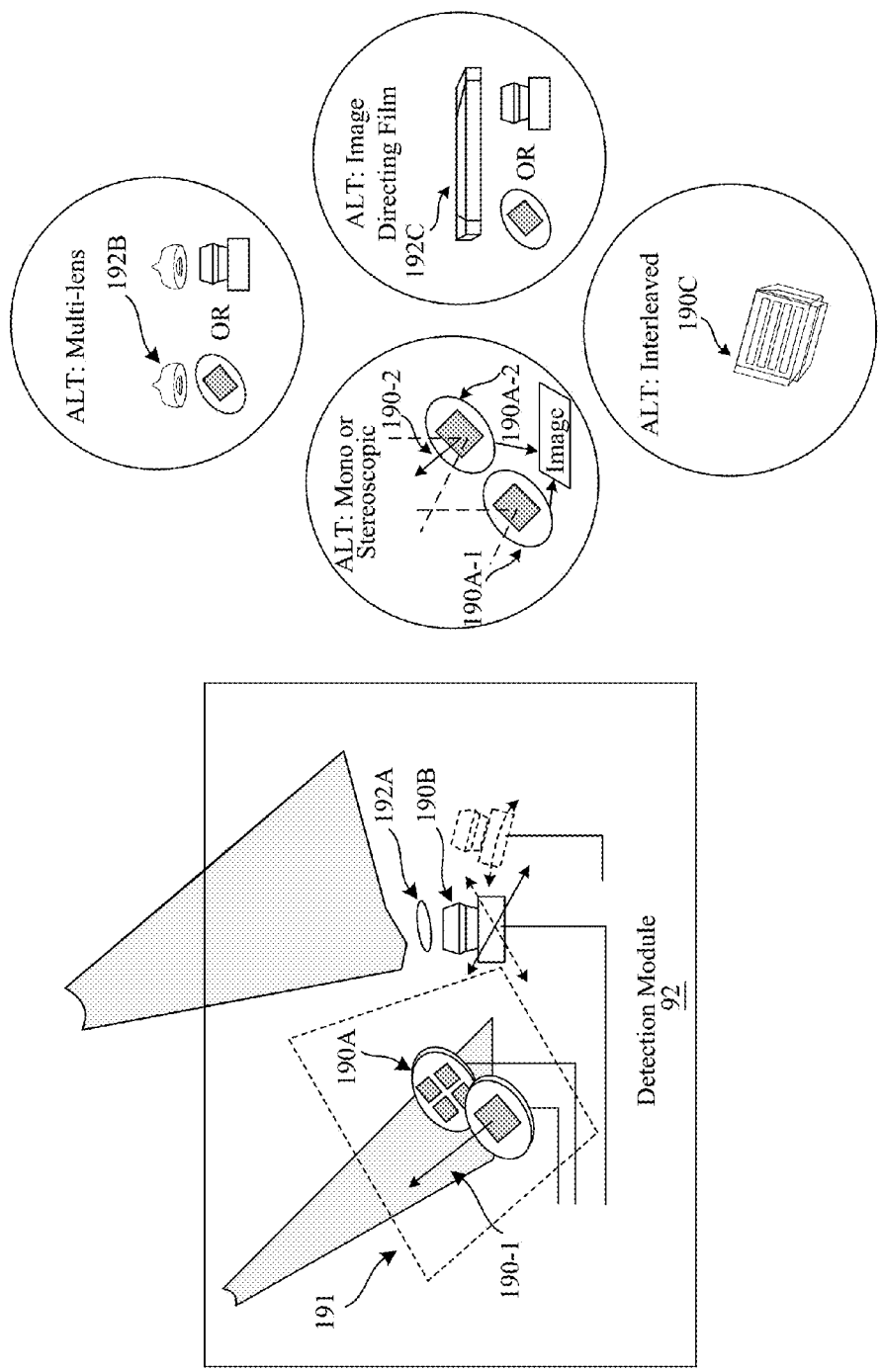
Figure 8:
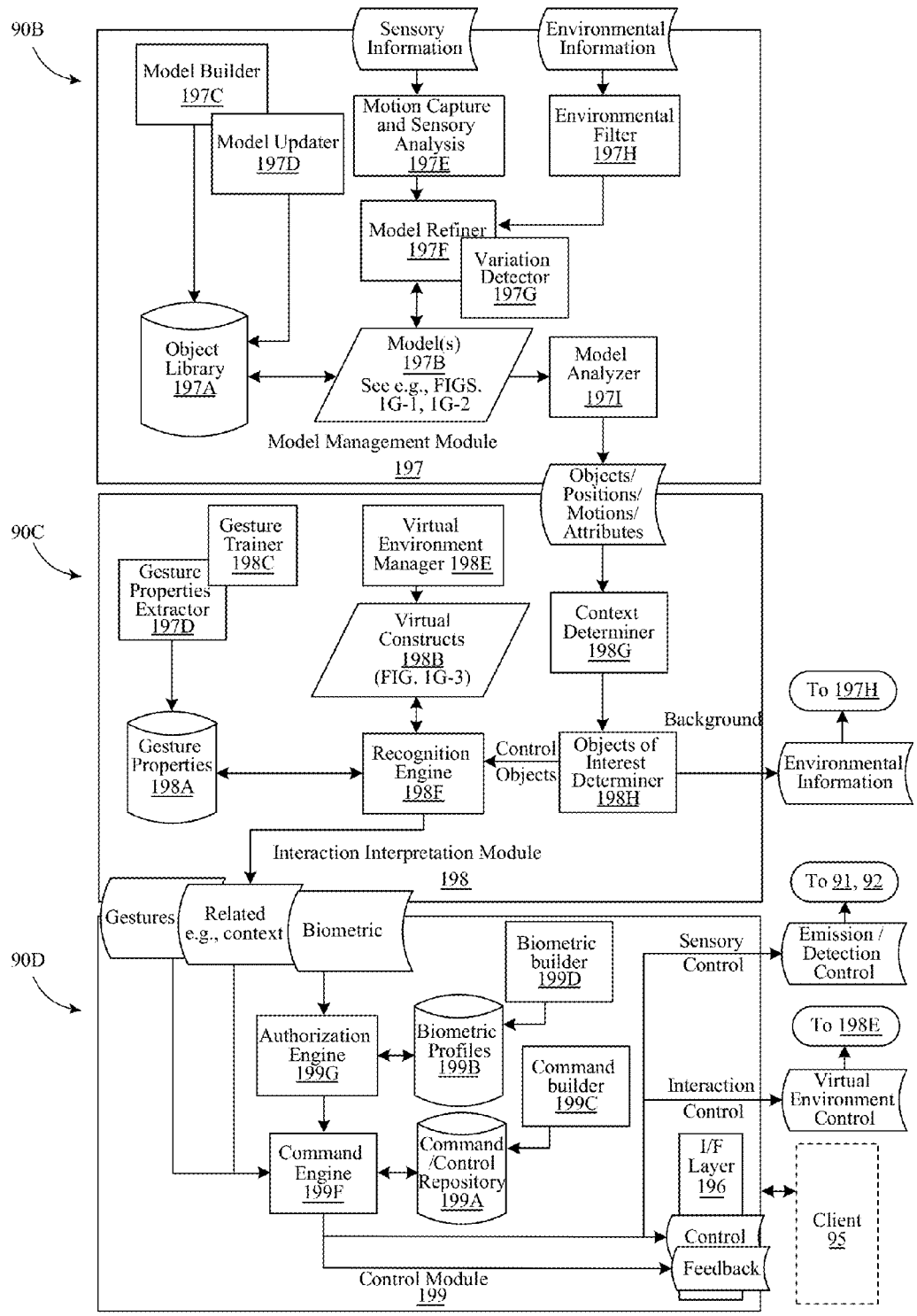
Figures 1, 8:
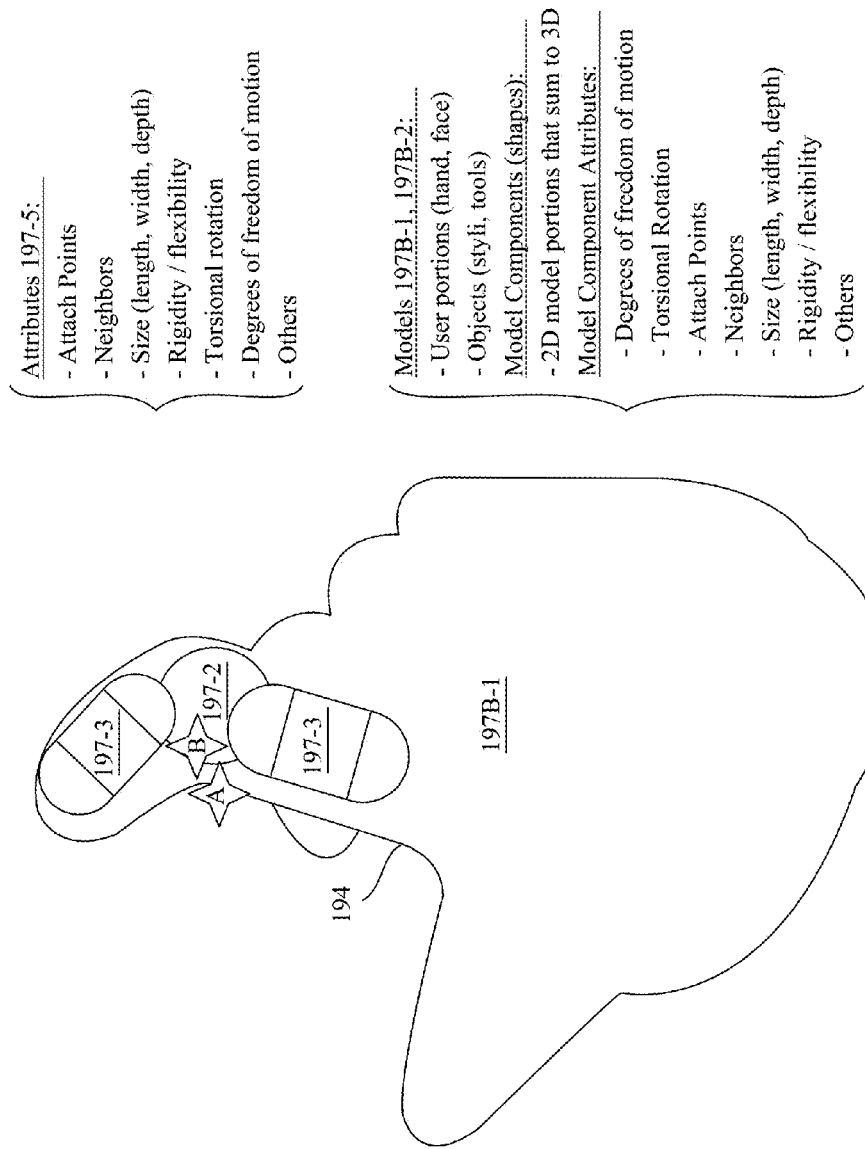
Figures 2, 8:
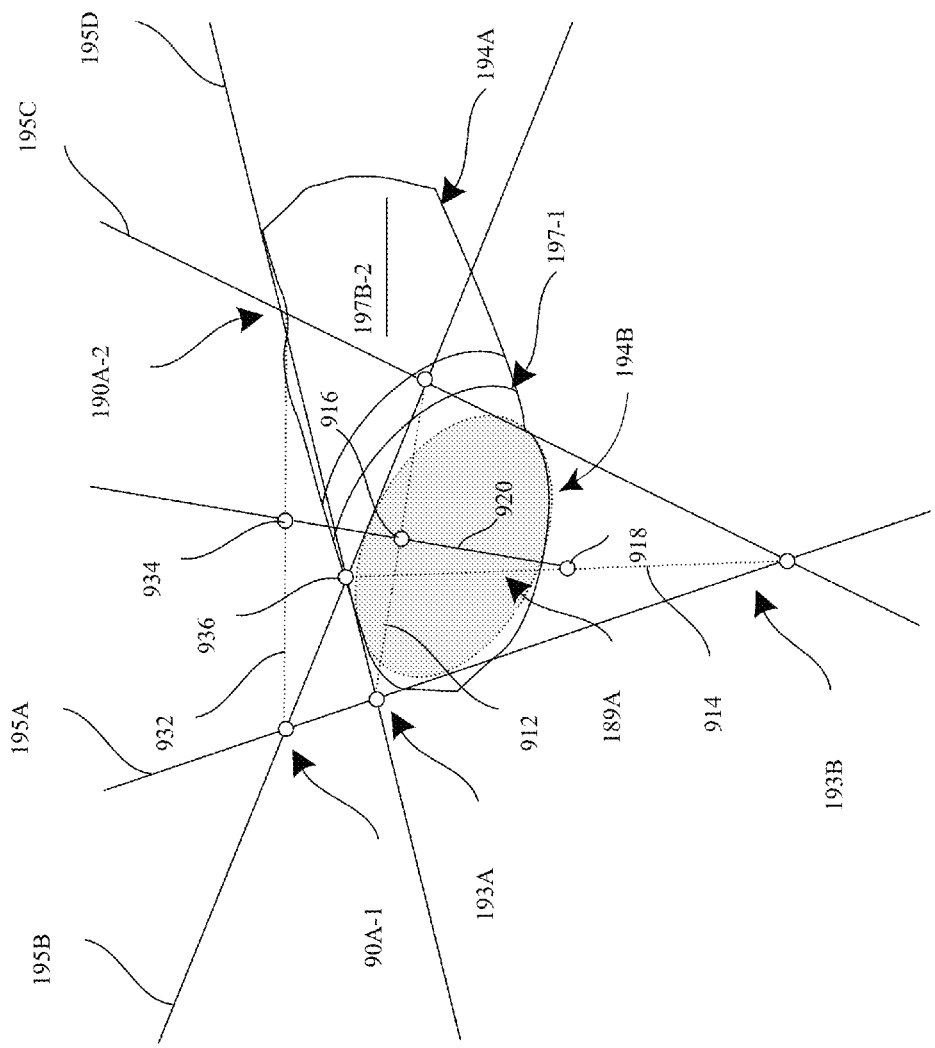
Figures 3, 8:
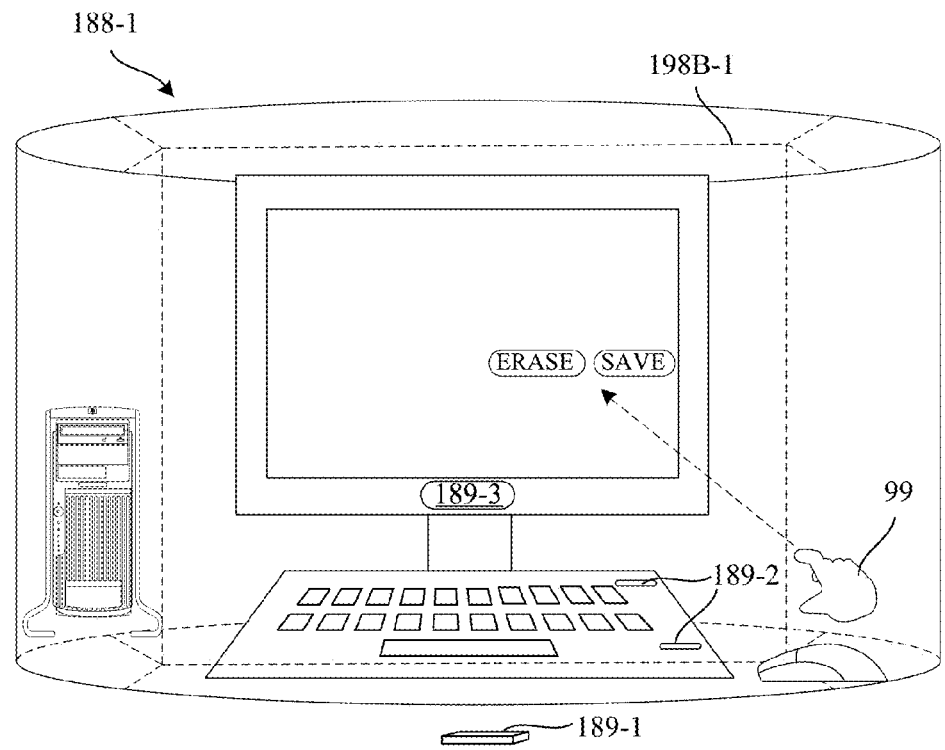
Figures 4, 8:
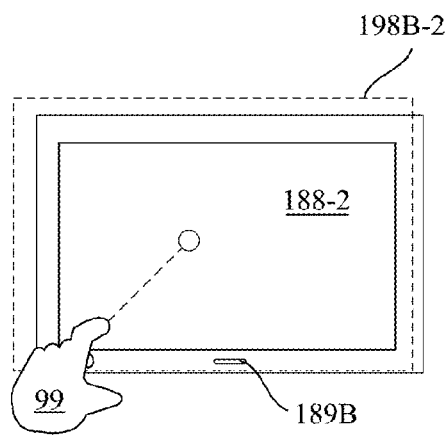

As shown by FIG. 1N, a method 112a of determining predictive information includes a block 181 in which a model or model sub-component applicable to the object(s) attribute(s) and/or motion(s) based on presence or variance of object(s), sensed using a detection system, such as detection system 90A of FIG. 7, is located in the object library 197A of FIG. 8. Sensing can include capturing image(s), detecting presence with scanning, obtaining other sensory information (e.g., olfactory, pressure, audio or combinations thereof) and/or combinations thereof. In a block 182, portion(s) of object(s) as detected or captured are analyzed to determine fit to model portion(s) (see e.g., FIGS. 8, 8-1, 8-2). In a block 183, predictive information is refined to include the model portion(s) determined in block 182. In a block 184, existence of other sensed object portion(s) is determined. If other object portion(s) have been sensed, then the method continues processing the other object portion(s). Otherwise, each of the sensed object portion(s) has been processed.

FIGS. 7-8 illustrate an exemplary machine sensory and control system in embodiments. In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

As FIG. 7 shows, one detection system 90A embodiment includes an emission module 91, a detection module 92, a controller 96, a processing module 94 and a machine control module 95. In one embodiment, the emission module includes one or more emitter(s) 181A, 181B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182, multi-lenses (of FIG. 7), image directing film (IDF) 182C (of FIG. 7-1), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 7-1) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 7-2) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 7-2) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 7-2) (e.g., lenses 192A (of FIG. 7-2), multi-lenses 192B (of FIG. 7-2), image directing film (IDF) 192C (of FIG. 7-2), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 7-2), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor—perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

For example and with reference to FIG. 8, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 8-1, 8-2)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2 of FIGS. 8-1-8-2), useful to define and update models 197B, and model attributes 197-5. While illustrated with reference to a particular embodiment in which models, model components and attributes are co-located within a common object library 197A, it should be understood that these objects will be maintained separately in some embodiments.

FIG. 8-1 illustrates prediction information including a model 197B-1 of a control object (e.g., FIG. 7: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 8-1 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

One or more attributes 197-5 can define characteristics of a model subcomponent 197-3. Attributes can include e.g., attach points, neighbors, sizes (e.g., length, width, depth), rigidity, flexibility, torsion, zero or more degrees of freedom of motion with respect to one or more defined points, which can include endpoints for example, and other attributes defining a salient characteristic or property of a portion of control object 99 being modeled by predictive information 197B-1. In an embodiment, predictive information about the control object can include a model of the control object together with attributes defining the model and values of those attributes.

In an embodiment, observation information including observation of the control object can be compared against the model at one or more of periodically, randomly or substantially continuously (i.e., in real time). Observational information can include without limitation observed values of attributes of the control object corresponding to the attributes of one or more model subcomponents in the predictive information for the control object. In an embodiment, comparison of the model with the observation information provides an error indication. In an embodiment, an error indication can be computed by determining a closest distance determined between a first point A belonging to a set of points defining the virtual surface 194 and a second point B belonging to a model subcomponent 197-2 determined to be corresponding to the first point (e.g., nearest to the first point for example). In an embodiment, the error indication can be applied to the predictive information to correct the model to more closely conform to the observation information. In an embodiment, error indication can be applied to the predictive information repeatedly until the error indication falls below a threshold, a measure of conformance with the observation information rises above a threshold, or a fixed or variable number of times, or a fixed or variable number of times per time period, or combinations thereof In an embodiment and with reference to FIGS. 7, 8-2, updating predictive information to observed information comprises selecting one or more sets of points (e.g., FIG. 8-2:193A, 193B) in space surrounding or bounding the control object within a field of view of one or more image capture device(s). As shown by FIG. 8-2, points 193 can be determined using one or more sets of lines 195A, 195B, 195C, and 195D originating at vantage point(s) (e.g., FIG. 7: 190-1, 190-2) associated with the image capture device(s) (e.g., FIG. 7: 190A-1, 190A-2) and determining therefrom one or more intersection point(s) defining a bounding region (i.e., region formed by lines FIGS. 8-2: 195A, 195B, 195C, and 195D) surrounding a cross-section of the control object. The bounding region can be used to define a virtual surface (FIG. 8-2: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F on FIG. 8.

For example and according to one embodiment illustrated by FIG. 8-2, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \quad (1)$$
$$(2C_3 y_c + C_2 x_c)y + (C_1 x_c^2 + C_2 x_c y_c + C_3 y_c^2 - 1) = 0$$

$$C_1 = \frac{\cos^2 \theta}{a^2} + \frac{\sin^2 \theta}{b^2}$$

$$C_2 = -2\cos\theta \sin\theta \left( \frac{1}{a^2} - \frac{1}{b^2} \right)$$

$$C_3 = \frac{\sin^2 \theta}{a^2} + \frac{\cos^2 \theta}{b^2}$$

The ellipse equation (1) is solved for $\theta$, subject to the constraints that: (1) $(x_C, y_C)$ must lie on the centerline determined from the four tangents 195A, 195B, 195C, and 195D (i.e., centerline 189A of FIG. 8-2); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$
$$A_2 x + B_2 y + D_2 = 0$$
$$A_3 x + B_3 y + D_3 = 0$$
$$A_4 x + B_4 y + D_4 = 0 \quad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \quad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1 / \delta 2$$

$$q = c1_1 - c1_2 * p$$

$$G = Ap + B$$

$$H = Aq + D \quad (4)$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix} \quad (5)$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for $\theta$ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \quad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of $\theta$ are defined as $\theta$=a tan(t).

$$Q_8 = 4A_1^2 n^2 v_{B2}^2 + 4 v_{B2} B_1^2 (1 - n^2 v_{A2}) - (G_1 (1 - n^2 v_{A2}) w_{B2} + n^2 v_{B2} w_{A2} + 2 H_1 v_{B2})^2 \quad (7)$$

$$Q_7 = -(2(2n^2 v_{AB} w_{A2} + 4 H_1 v_{AB} + 2 G_1 n^2 v_{AB} w_{B2} + 2 G_1 (1 - n^2 v_{A2}) w_{AB})) (G_1 (1 - n^2 v_{A2}) w_{B2} + n^2 v_{B2} w_{A2} + 2 H_1 v_{B2}) - 8 A_1 B_1 n^2 v_{B2}^2 + 16 A_1^2 n^2 v_{AB} v_{B2} + (4(2A_1 B_1 (1 - n^2 v_{A2}) + 2 B_1^2 n^2 v_{AB})) v_{B2} + 8 B_1^2 (1 - n^2 v_{A2}) v_{AB} \quad (8)$$

$$Q_6 = -(2(2H_1 v_{B2} + 2H_1 v_{A2} + n^2 v_{A2} w_{A2} + n^2 v_{B2}(-2w_{AB} + w_{B2}) + G_1(n^2 v_{B2} + 1) w_{B2} + 4G_1 n^2 v_{AB} w_{AB} + G_1(1 - n^2 v_{A2}) v_{A2})) \times (G_1(1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1(1 - n^2 v_{A2}) w_{AB})^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) + 4A_1^2 n^2 v_{B2}^2 + (4(A_1^2(1 - n^2 v_{A2}) + 4A_1 B_1 n^2 v_{AB} + B_1^2(-n^2 v_{B2} + 1) + B_1^2(1 - n^2 v_{A2}))) v_{B2} + (8(2A_1 B_1(1 - n^2 v_{A2}) + 2B_1^2 n^2 v_{AB})) v_{AB} + 4B_1^2(1 - n^2 v_{A2}) v_{A2}$$ (9)

$$Q_5 = -(2(4H_1 v_{AB} + 2G_1(-n^2 v_{B2} + 1) w_{AB} + 2G_1 n^2 v_{AB} v_{A2} + 2n^2 v_A(-2w_{AB} + w_{B2}))) (G_1(1 - n^2 v_{A2}) w_{B2} + n^2 v_{B2} w_{A2} + 2H_1 v_{B2}) - (2(2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2})) \times (2n^2 v_{AB} w_{A2} + 4H_1 v_{AB} + 2G_1 n^2 n_{AB} w_{B2} + 2G_1(1 - n^2 v_{A2}) w_{AB}) + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} - 8A_1 B_1 n^2 v_{B2}^2 + 16A_1^2 n^2 v_{AB} v_{B2} + 4(2A_1^2 n^2 v_{AB} + 2A_1 B_1(-n^2 n_{B2} + 1) + 2A_1 B_1(1 - n^2 v_{A2}) + 2B_1^2 n^2 v_{AB})) v_{B2} + (8(A_1^2(1 - n^2 v_{A2}) + 4A_1 B_1 n^2 v_{AB} + B_1^2(-n^2 v_{B2} + 1) + B_1^2(1 - n^2 v_{A2}))) v_{AB} + (4(2A_1 B_1(1 - n^2 v_{A2}) + 2B_1^2 n^2 v_{AB})) v_{A2}$$ (10)

$$Q_4 = (4(A_1^2(-n^2 v_{B2}) + A_1^2(1 - n^2 v_{A2}) + 4A_1 B_1 n^2 v_{AB} + B_1^2(-n^2 v_{B2} + 1))) v_{B2} + (8(2A_1^2 n^2 v_{AB} + 2A_1 B_1(-n^2 v_{B2} + 1) + 2A_1 B_1(1 - n^2 v_{A2}) + 2B_1^2 n^2 v_{AB})) v_{AB} + (4(A_1^2(1 - n^2 v_{A2}) + 4A_1 B_1 n^2 v_{AB} + B_1^2(-n^2 v_{B2} + 1) + B_1^2(1 - n^2 v_{A2}))) v_{A2} + 4B_1^2 n^2 (2v_{A2} v_{B2} - 4v_{AB}^2) - 32A_1 A_1 n^2 v_{A2} v_{AB} + 4A_1^2 n^2 v_{A2}^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) - (2(G_1(-n^2 v_{B2} + 1) v_{A2} + n^2 v_{A2}(-2w_{AB} + w_{B2}) + 2H_1 v_{A2}))(G_1(1 - n^2 v_{A2}) w_{B2} + n^2 v_{B2} w_{A2} 2H_1 v_{B2}) - (2(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times (2n^2 v_{AB} w_{A2} + 4H_1 v_{AB} + 2G_1 n^2 v_{AB} w_{B2} + 2G_1(1 - n^2 v_{A2}) w_{AB}) - (2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2})^2$$ (11)

$$Q_3 = -(2(G_1(-n^2 v_{B2} + 1) v_{A2} + n^2 v_{A2}(-2w_{AB} w_{B2}) + 2H_1 v_{A2}))(2n^2 v_{AB} w_{A2} + 4H_1 v_{AB} + 2G_1 n^2 v_{AB} w_{B2} + 2G_1(1 - n^2 v_{A2}) w_{AB}) - (2(2H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))) \times (2H_1 v_{B2} + 2H_1 v_{A2} + n^2 v_{A2} w_{A2} + n^2 v_{B2}(-2w_{AB} w_{B2}) + G_1(-n^2 v_{B2} + 1) w_{B2} + 4G_1 n^2 v_{AB} w_{AB} + G_1(1 - n^2 v_{A2})(v_{A2}) + 16B_1^2 n^2 v_{A2} v_{AB} - 8A_1 B_1 n^2 v_{A2}^2 + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} + (4(2A_1^2 n^2 v_{AB} + 2A_1 B_1(-n^2 v_{B2} + 1))) v_{B2} + (8(A_1^2(-n^2 v_{B2} + 1) + A_1^2(1 - n^2 v_{A2}) + 4A_1 B_1 n^2 v_{AB} + B_1^2(-n^2 v_{B2} + 1))) v_{AB} + (4(2A_1^2 n^2 v_{AB} + 2A_1 B_1(-n^2 v_{B2} + 1) + 2A_1 B_1(1 - n^2 v_{A2}) + 2B_1^2 n^2 v_{AB})) v_{A2}$$ (12)

$$Q_2 = 4A_1^2(-n^2 v_{B2} + 1) v_{B2} + (8(2A_1^2 n^2 v_{AB} + 2A_1 B_1(-n^2 v_{B2} + 1))) v_{AB} + (4(A_1^2(-n^2 n_{B2} + 1) + A_1^2(1 - n^2 v_{A2}) + 4A_1 B_1 n^2 v_{AB} + B_1^2(-n^2 v_{B2} + 1))) v_{A2} + 4B_1^2 n^2 v_{A2}^2 + 4B_1^2 n^2 (2v_{A2} v_{B2} + 4v_{AB}^2) - 32A_1 B_1 n^2 v_{A2} v_{AB} + 4A_1^2 n^2 v_{A2}^2 - (2(G_1(-n^2 v_{B2} + 1) v_{A2} + n^2 v_{A2}(-2w_{AB} + w_{B2}) + 2H_1 v_{A2})) \times (2H_1 v_{B2} + 2H_1 v_{A2} + n^2 v_{A2} w_{A2} + n^2 v_{B2}(-2w_{AB} + w_{B2}) + G_1(-n^2 v_{B2} + 1) w_{B2} + 4G_1 n^2 v_{AB} w_{AB} + G_1(1 - n^2 v_{A2}) v_{A2}) - (4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))^2$$ (13)

$$Q_1 = 8A_1^2(-n^2 v_{B2} + 1) v_{AB} + (4(2A_1^2 n^2 v_{AB} + 2A_1 B_1(-n^2 v_{B2} + 1))) v_{A2} + 16B_1^2 n^2 v_{A2} v_{AB} - 8A_1 B_1 n^2 v_{A2}^2 - (2(G_1(-n^2 v_{B2} + 1) v_{A2} + n^2 v_{A2}(-2w_{AB} + w_{B2}) + 2H_1 v_{A2}))(4H_1 v_{AB} + 2G_1(-n^2 v_{B2} + 1) w_{AB} + 2G_1 n^2 v_{AB} v_{A2} + 2n^2 v_{AB}(-2w_{AB} + w_{B2}))$$ (14)

$$Q_0 = 4A_1^2(-n^2 v_{B2} + 1) v_{A2} - (G_1(-n^2 v_{B2} + 1) v_{A2} + n^2 v_{A2}(-2w_{AB} + w_{B2}) + 2H_1 v_{A2})^2 + 4B_1^2 n^2 v_{A2}^2$$ (15)

In this exemplary embodiment, equations (6)-(15) have at most three real roots; thus, for any four tangent lines, there are at most three possible ellipses that are tangent to all four lines and that satisfy the $a=a_0$ constraint. (In some instances, there may be fewer than three real roots.) For each real root $\theta$, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters $\{\theta, a=a_0, b, (x_C, y_C)\}$. Alternatively, or additionally, a model builder 197C and model updater 197D provide (FIG. 8) functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

In an embodiment, when the control object morphs, conforms, and/or translates, motion information reflecting such motion(s) is included into the observed information. Points in space can be recomputed based on the new observation information. The model subcomponents can be scaled, sized, selected, rotated, translated, moved, or otherwise re-ordered to enable portions of the model corresponding to the virtual surface(s) to conform within the set of points in space.

In an embodiment, motion(s) of the control object can be rigid transformation, in which case, points on the virtual surface(s) remain at the same distance(s) from one another through the motion. Motion(s) can be non-rigid transformations, in which points on the virtual surface(s) can vary in distance(s) from one another during the motion. In an embodiment, observation information can be used to adjust (and/or recomputed) predictive information thereby enabling "tracking" the control object. In embodiments, control object can be tracked by determining whether a rigid transformation or a non-rigid transformation occurs. In an embodiment, when a rigid transformation occurs, a transformation matrix is applied to each point of the model uniformly. Otherwise, when a non-rigid transformation occurs, an error indication can be determined, and an error minimization technique such as described herein above can be applied. In an embodiment, rigid transformations and/or non-rigid transformations can be composed. One example composition embodiment includes applying a rigid transformation to predictive information. Then an error indication can be determined, and an error minimization technique such as described herein above can be applied. In an embodiment, determining a transformation can include calculating a rotation matrix that provides a reduced RMSD (root mean squared deviation) between two paired sets of points. One embodiment can include using Kabsch Algorithm to produce a rotation matrix. In an embodiment and by way of example, one or more force lines can be determined from one or more portions of a virtual surface.

Collisions

In an embodiment, predictive information can include collision information concerning two or more capsoloids. By means of illustration, several possible fits of predicted information to observed information can be removed from consideration based upon a determination that these potential solutions would result in collisions of capsoloids. In an embodiment, a relationship between neighboring capsoloids, each having one or more attributes (e.g., determined minima and/or maxima of intersection angles between capsoloids) can be determined. In an embodiment, determining a relationship between a first capsoloid having a first set of attributes and a second capsoloid having a second set of attributes includes detecting and resolving conflicts between first attribute and second attributes. For example, a conflict can include a capsoloid having one type of angle value with a neighbor having a second type of angle value incompatible with the first type of angle value. Attempts to attach a capsoloid with a neighboring capsoloid having attributes such that the combination will exceed what is allowed in the observed—or to pair incompatible angles, lengths, shapes, or other such attributes—can be removed from the predicted information without further consideration.

Lean Model

In an embodiment, predictive information can be artificially constrained to capsoloids positioned in a subset of the observed information-thereby enabling creation of a "lean model". For example, as illustrated in FIG. 8-1, capsoloid 197-3 could be used to denote the portion of the observed without addition of capsoloids 197-2. In a yet further embodiment, connections can be made using artificial constructs to link together capsoloids of a lean model. In another embodiment, the predictive information can be constrained to a subset of topological information about the observed information representing the control object to form a lean model. In an embodiment, a lean model can be associated with a full predictive model. The lean model (or topological information, or properties described above) can be extracted from the predictive model to form a constraint. Then, the constraint can be imposed on the predictive information thereby enabling the predictive information to be constrained in one or more of behavior, shape, total (system) energy, structure, orientation, compression, shear, torsion, other properties, and/or combinations thereof.

Occlusions

In an embodiment, the observed can include components reflecting portions of the control object which are occluded from view of the device ("occlusions" or "occluded components"). In one embodiment, the predictive information can be "fit" to the observed as described herein above with the additional constraint(s) that some total property of the predictive information (e.g., potential energy) be minimized or maximized (or driven to lower or higher value(s) through iteration or solution). Properties can be derived from nature, properties of the control object being viewed, others, and/or combinations thereof. In another embodiment, as shown by FIGS. 8-1 and 8-2, a deformation of the predictive information subcomponent 359 can be allowed subject to an overall permitted value of compression, deformation, flexibility, others, and/or combinations thereof.

Friction

In an embodiment, a "friction constraint" is applied on the model 197B-1. For example, if fingers of a hand being modeled are close together (in position or orientation), corresponding portions of the model will have more "friction". The more friction a model subcomponent has in the model, the less the subcomponent moves in response to new observed information. Accordingly the model is enabled to mimic the way portions of the hand that are physically close together move together, and move less overall.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 8, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 8-3, 8-4: 198B-1, 198B-2) to recognize variations in control object presence or motion indicating command information, related information, environmental information and other information discernable from the object, position, motion and attribute information that might be useful in controlling a machine. With reference to FIG. 8-3, 8-4, virtual construct 198B-1, 198B-2 implement an engagement target with which a control object 99 interacts-enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 8-3, 8-4). In some embodiments, virtual constructs (e.g., a virtual object defined in space; such that variations in real objects relative to the virtual construct, when detected, can be interpreted for control or other purposes (see FIGS. 8-3, 8-4)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D. Further with reference to FIG. 8, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 8-3, 8-4, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 8-3: 189-2, 189-3, FIG. 8-4: 189B) or combinations thereof.

Figure 9:
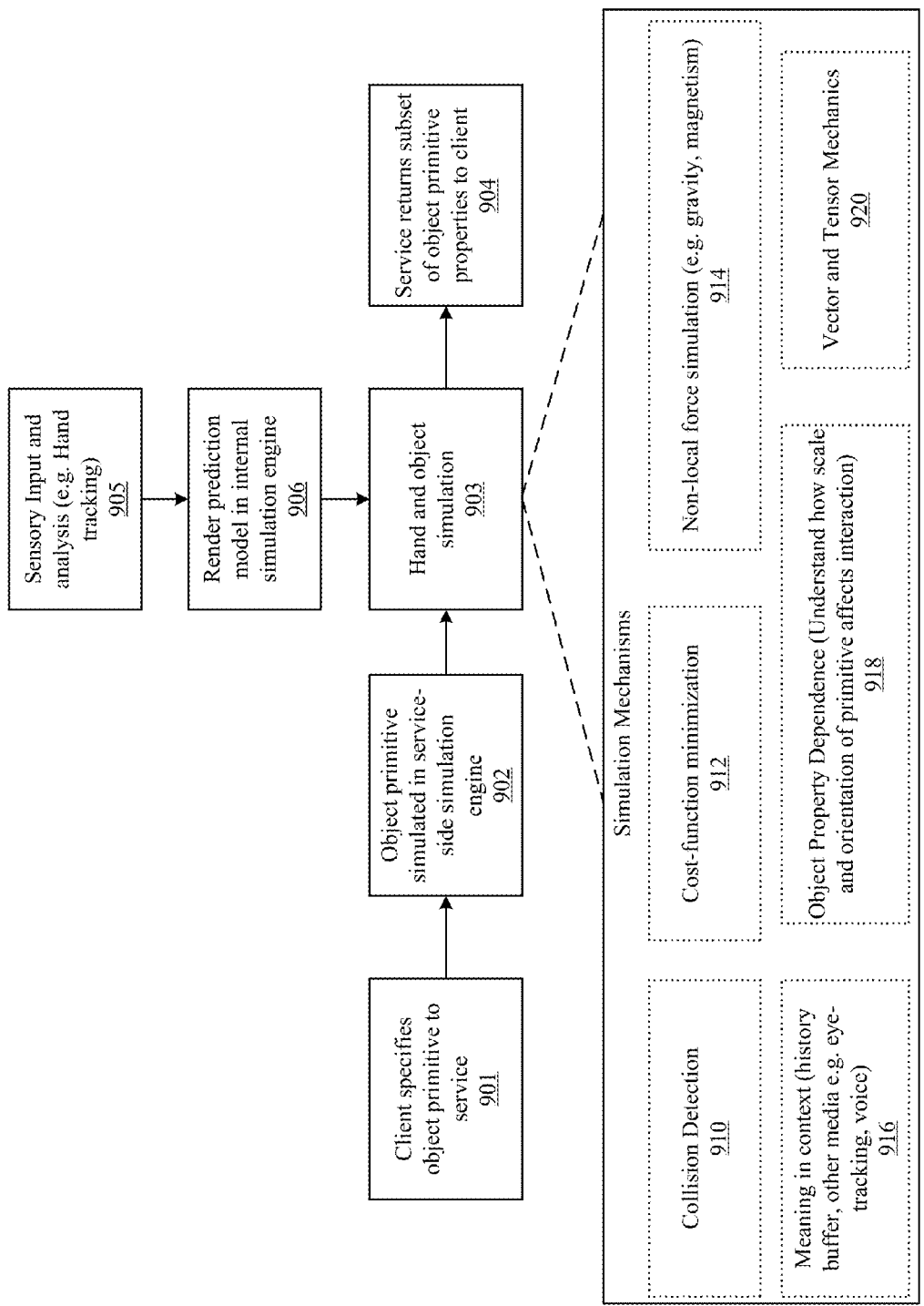
FIG. 9 illustrates a sensory augmentation system to add simulated sensory information to a virtual reality input.

FIG. 9 illustrates a sensory augmentation system to add simulated sensory information to a virtual reality input. The system is adapted to receive a virtual reality input including a primitive (901). Virtual reality primitives can include e.g., virtual character, virtual environment, others, or properties thereof. The primitive is simulated by a service side simulation engine (902). Information about a physical environment is sensed and analyzed (905). See also FIGS. 7 and 8. A predictive information (e.g., model, etc.) is rendered in an internal simulation engine (906). Predictive information and processes for rendering predictive models are described in further detail with reference to FIGS. 8-1, 8-2. Hands and/or other object types are simulated (903) based upon results of the object primitive simulation in the service side simulation engine and the results of the prediction information rendered in an internal simulation engine. (See also FIG. 8: 197I). In embodiments, various simulation mechanisms 910-920 are employed alone or in conjunction with one another as well as other existing/emerging simulation mechanisms and/or some combination thereof can also be utilized in accordance with the requirements of a particular implementation. The service returns as a result a subset of object primitive properties to the client (904). Object primitive properties can be determined from the simulation mechanisms 910-920, the predictive information, or combinations thereof.

In an embodiment, a simulation mechanism comprises simulating the effect of a force (914). In an embodiment, a simulation mechanism comprises minimizing a cost function (912).

In an embodiment, a simulation mechanism comprises detecting a collision (910).

In an embodiment, a simulation mechanism comprises determining a meaning in context (916). Sometimes, determining a meaning in context further comprises eye tracking. In some applications determining a meaning in context further comprises recognizing at least one parameter of the human voice.

In an embodiment, a simulation mechanism comprises recognizing an object property dependence (e.g., understanding how scale and orientation of primitive affects interaction.

In an embodiment, a simulation mechanism comprises vector or tensor mechanics (920).

Figure 10:
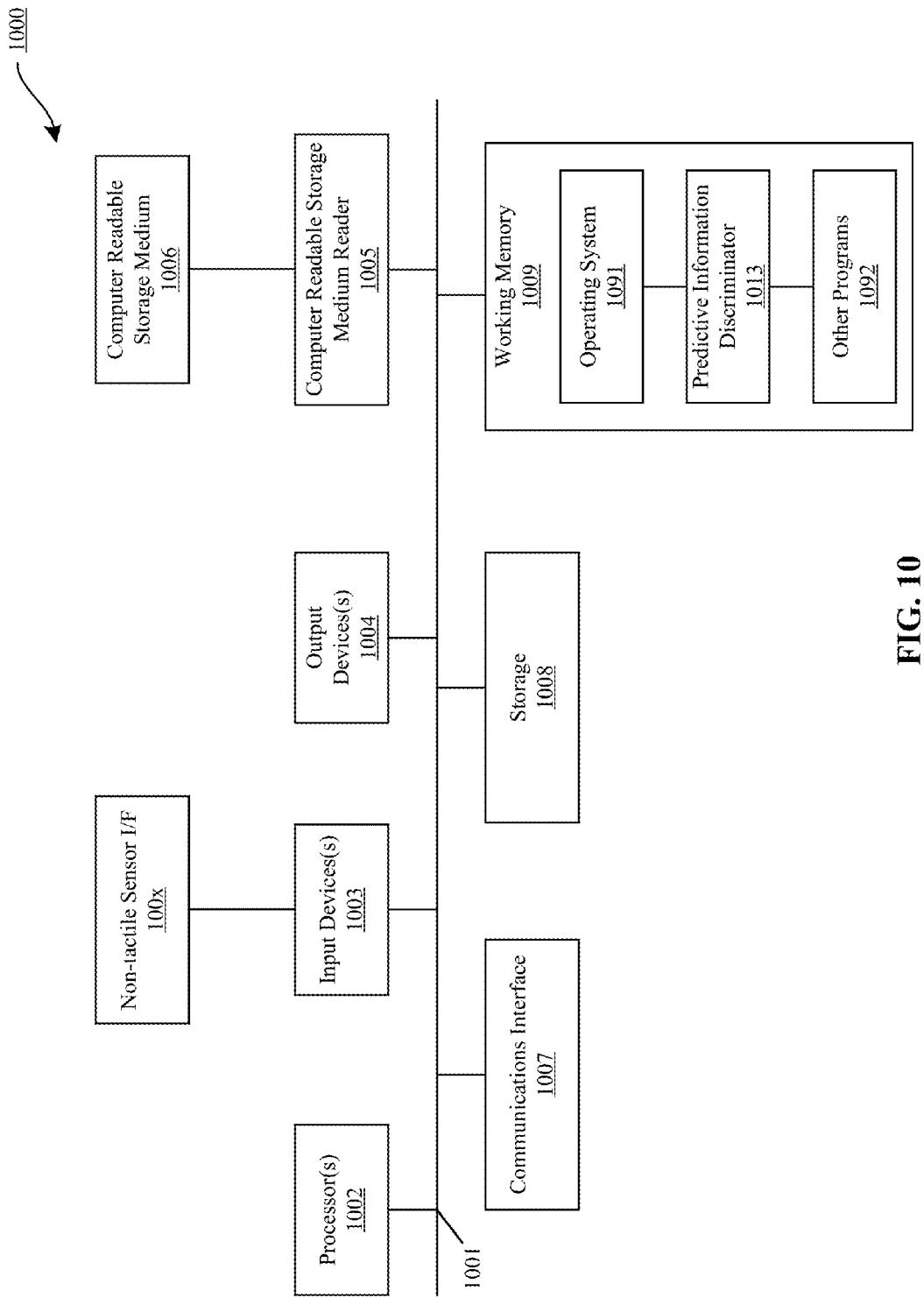
FIG. 10 illustrates an exemplary computing system according to an embodiment.

FIG. 10 illustrates an exemplary computing system 1000, such as a PC (or other suitable "processing" system), that can comprise one or more of the MSCS elements shown in FIGS. 7-8 according to an embodiment. While other application-specific device/process alternatives might be utilized, such as those already noted, it will be presumed for clarity sake that systems 90A-90D elements (FIGS. 7-8) are implemented by one or more processing systems consistent therewith, unless otherwise indicated.

As shown, computer system 1000 comprises elements coupled via communication channels (e.g. bus 1001) including one or more general or special purpose processors 1002, such as a Pentium® or Power PC®, digital signal processor ("DSP"), or other processing. System 1000 elements also include one or more input devices 1003 (such as a mouse, keyboard, joystick, microphone, remote control unit, tactile, biometric or other sensors, and so on), and one or more output devices 1004, such as a suitable display, joystick feedback components, speakers, biometric or other actuators, and so on, in accordance with a particular application.

System 1000 elements also include a computer readable storage media reader 1005 coupled to a computer readable storage medium 1006, such as a storage/memory device or hard or removable storage/memory media; examples are further indicated separately as storage device 1008 and non-transitory memory 1009, which can include hard disk variants, floppy/compact disk variants, digital versatile disk ("DVD") variants, smart cards, read only memory, random access memory, cache memory or others, in accordance with a particular application (e.g. see data store(s) 197A, 198A, 199A and 199B of FIG. 8). One or more suitable communication devices 1007 can also be included, such as a modem, DSL, infrared, etc. for providing inter-device communication directly or via suitable private or public networks, such as the Internet. Working memory 1009 is further indicated as including an operating system ("OS") 1091, interaction discriminator 1013 and other programs 1092, such as application programs, mobile code, data, or other information for implementing systems 90A-90D elements, which might be stored or loaded therein during use.

System 1000 element implementations can include hardware, software, firmware or a suitable combination. When implemented in software (e.g. as an application program, object, downloadable, servlet, and so on, in whole or part), a system 1000 element can be communicated transitionally or more persistently from local or remote storage to memory for execution, or another suitable mechanism can be utilized, and elements can be implemented in compiled, simulated, interpretive or other suitable forms. Input, intermediate or resulting data or functional elements can further reside more transitionally or more persistently in a storage media or memory, (e.g. storage device 1008 or memory 1009) in accordance with a particular application.

Certain potential interaction determination, virtual object selection, authorization issuances and other aspects enabled by input/output processors and other element embodiments disclosed herein can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Figure 11:
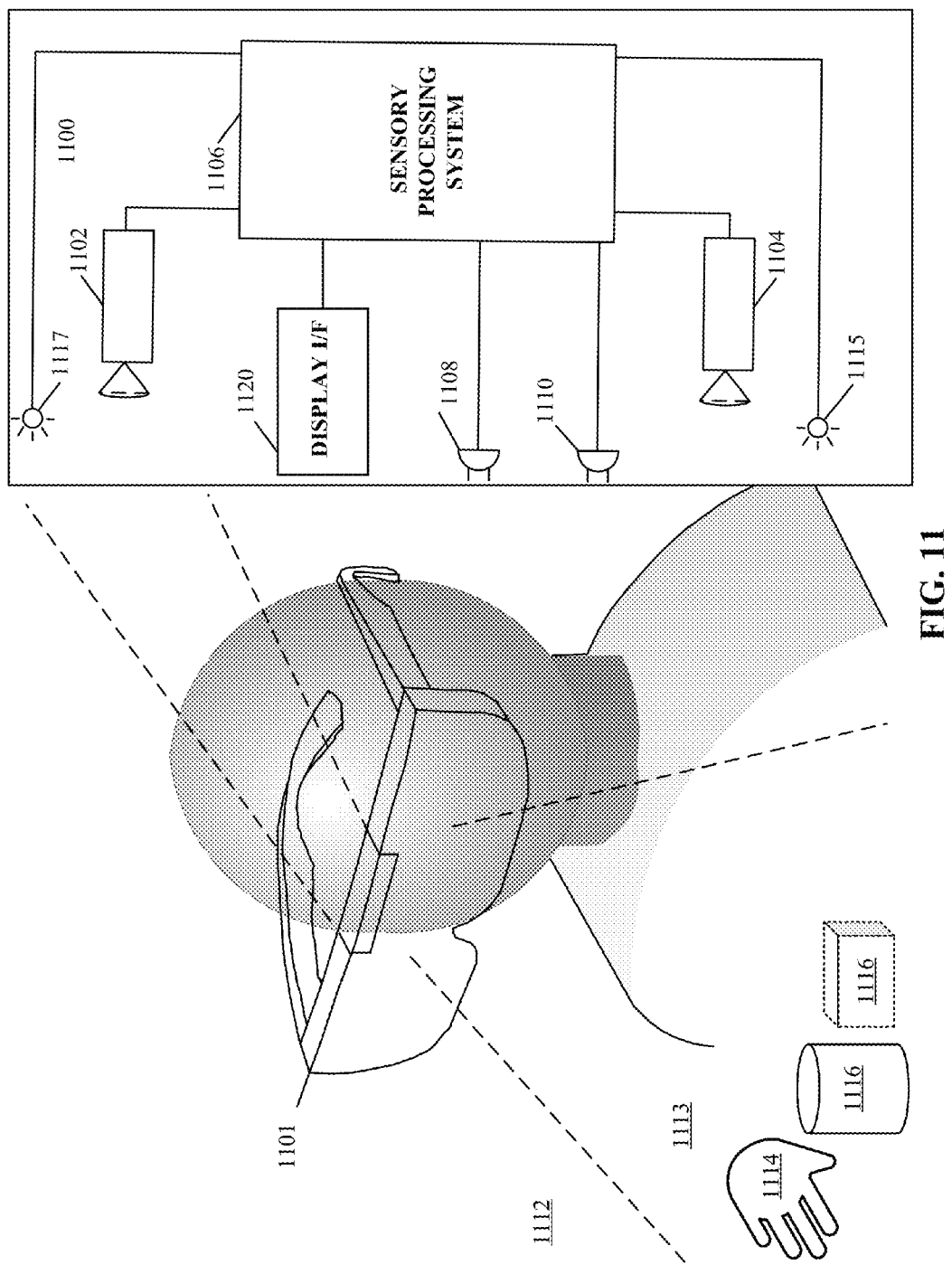
FIG. 11 illustrates a system for capturing image and other sensory data according to an implementation of the technology disclosed.

FIG. 11 illustrates a system for capturing image and other sensory data according to an implementation of the technology disclosed.

Refer first to FIG. 11, which illustrates a system for capturing image data according to one implementation of the technology disclosed. System 1100 is preferably coupled to a wearable device 1101 that can be a personal head mounted display (HMD) having a goggle form factor such as shown in FIG. 11, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 11, a head-mounted device 1101 can include an optical assembly that displays a surrounding environment or a virtual environment to the user; incorporation of the motion-capture system 1100 in the head-mounted device 1101 allows the user to interactively control the displayed environment. For example, a virtual environment can include virtual objects that can be manipulated by the user's hand gestures, which are tracked by the motion-capture system 1100. In one implementation, the motion-capture system 1100 integrated with the head-mounted device 1101 detects a position and shape of user's hand and projects it on the display of the head-mounted device 1100 such that the user can see her gestures and interactively control the objects in the virtual environment. This can be applied in, for example, gaming or internet browsing.

In one embodiment, information about the interaction with a virtual object can be shared by a first HMD user with a HMD of a second user. For instance, a team of surgeons can collaborate by sharing with each other virtual incisions to be performed on a patient. In some embodiments, this is achieved by sending to the second user the information about the virtual object, including primitive(s) indicating at least one of a type, size, and/or features and other information about the calculation point(s) used to detect the interaction. In other embodiments, this is achieved by sending to the second user information about the predictive model used to track the interaction.

System 1100 includes any number of cameras 1102, 1104 coupled to sensory processing system 1106. Cameras 1102, 1104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 1102, 1104 are preferably capable of capturing video images (i.e., successive image frames at a constant rate of at least 15 frames per second); although no particular frame rate is required. The capabilities of cameras 1102, 1104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 1102, 1104 can be oriented toward portions of a region of interest 1112 by motion of the device 1101, in order to view a virtually rendered or virtually augmented view of the region of interest 1112 that can include a variety of virtual objects 1116 as well as contain an object of interest 1114 (in this example, one or more hands) moves within the region of interest 1112. One or more sensors 1108, 1110 capture motions of the device 1101. In some implementations, one or more light sources 1115, 1117 are arranged to illuminate the region of interest 1112. In some implementations, one or more of the cameras 1102, 1104 are disposed opposite the motion to be detected, e.g., where the hand 1114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 1106, which can be, e.g., a computer system, can control the operation of cameras 1102, 1104 to capture images of the region of interest 1112 and sensors 1108, 1110 to capture motions of the device 1101. Information from sensors 1108, 1110 can be applied to models of images taken by cameras 1102, 1104 to cancel out the effects of motions of the device 1101, providing greater accuracy to the virtual experience rendered by device 1101. Based on the captured images and motions of the device 1101, sensory processing system 1106 determines the position and/or motion of object 1114.

For example, as an action in determining the motion of object 1114, sensory processing system 1106 can determine which pixels of various images captured by cameras 1102, 1104 contain portions of object 1114. In some implementations, any pixel in an image can be classified as an "object" pixel or a "background" pixel depending on whether that pixel contains a portion of object 1114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 1102, 1104 and cancelling out captured motions of the device 1101 from sensors 1108, 1110 allows sensory processing system 1106 to determine the location in 3D space of object 1114, and analyzing sequences of images allows sensory processing system 1106 to reconstruct 3D motion of object 1114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 1120 employs projection techniques in conjunction with the sensory based tracking in order to present virtual (or virtualized real) objects (visual, audio, haptic, and so forth) created by applications loadable to, or in cooperative implementation with, the device 1101 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 1102, 1104 or acoustic or other sensory devices. Control information is communicated to a system based in part on a combination of the motion of the portable device 1101 and the detected motion of the user determined from the sensory information received from imaging 1102, 1104 or acoustic or other sensory devices. The virtual device experience can be augmented in some implementations by the addition of haptic, audio and/or other sensory information projectors. For example, an optional video projector 1120 can project an image of a page (e.g., virtual device) from a virtual book object superimposed upon a real world object, e.g., desk 1116 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 1114 is projected to the user, so that the scene looks to the user as if the user is looking at the user's own hand(s).

A plurality of sensors 1108, 1110 coupled to the sensory processing system 1106 to capture motions of the device 1101. Sensors 1108, 1110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 1100 can include any of various other sensors not shown in FIG. 11 for clarity, alone or in various combinations, to enhance the virtual experience provided to the user of device 1101. For example, in low-light situations where free-form gestures cannot be recognized optically with a sufficient degree of reliability, system 1106 may switch to a touch mode in which touch gestures are recognized based on acoustic or vibrational sensors. Alternatively, system 1106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 1106 from a standby mode to an operational mode. For example, the system 1106 may enter the standby mode if optical signals from the cameras 1102, 104 are absent for longer than a threshold interval.

It will be appreciated that the Figures shown in FIG. 11 are illustrative. In some implementations, it may be desirable to house the system 1100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

Reference in the specification to "one embodiment" or "an embodiment" means that a particular feature, structure, or characteristic described in connection with the embodiment is included in at least one embodiment of the technology disclosed. The appearances of the phrase "in one embodiment" in various places in the specification are not necessarily all referring to the same embodiment.

Figure 12:
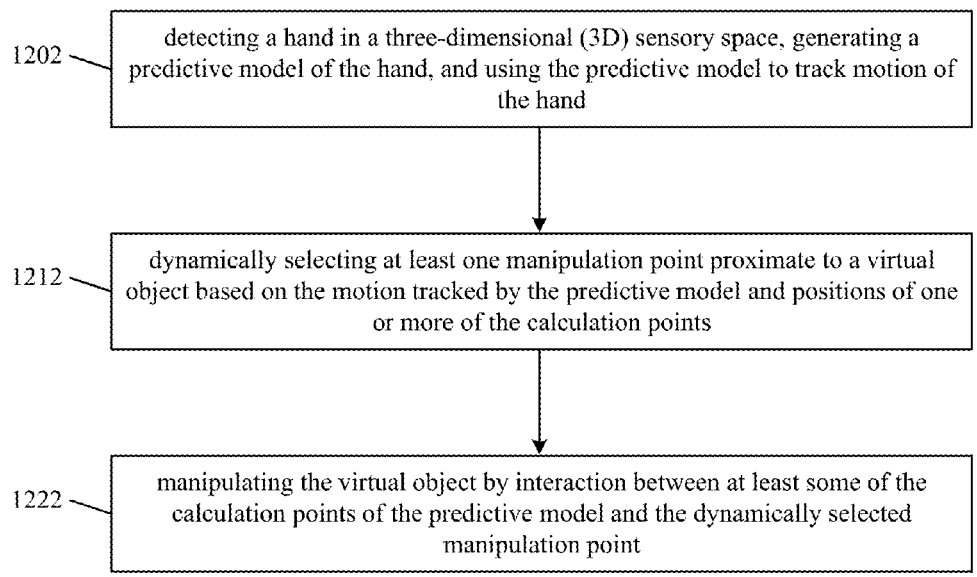
FIG. 12 shows a flowchart of manipulating a virtual object.

FIG. 12 shows a flowchart 1200 of manipulating a virtual object. Flowchart shown in FIG. 12 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 12. Multiple actions can be combined in some implementations. For convenience, this flowchart is described with reference to the system that carries out a method. The system is not necessarily part of the method.

At action 1202, a hand is detected in a three-dimensional (3D) sensory space and a predictive model of the hand is generated, and the predictive model is used to track motion of the hand. The predictive model includes positions of calculation points of fingers, thumb and palm of the hand. Flowchart 1200 further includes generating data for augmented display representing a position of the virtual object relative to the predictive model of the hand. It also includes, generating data for display representing positions in a rendered virtual space of the virtual object and the predictive model of the hand, according to one embodiment.

Flowchart 1200 also relates to manipulating the virtual object responsive to a proximity between at least some of the calculation points of the predictive model and the manipulation point of the virtual object.

In one embodiment, the calculation points include opposable finger tips and a base of the hand. In another embodiment, the calculation points include an opposable finger and thumb.

At action 1212, at least one manipulation point proximate to a virtual object is dynamically selected based on the motion tracked by the predictive model and positions of one or more of the calculation points. In some embodiments, the dynamically selected manipulation point is selected from a predetermined list of available manipulation points for a particular form of the virtual object. In other embodiments, the dynamically selected manipulation point is created proximate to the virtual object based on the motion tracked by the predictive model and positions of the calculation points.

Flowchart 1200 also includes dynamically selecting at least one grasp point proximate to the predictive model based on the motion tracked by the predictive model and positions of two or more of the calculation points on the predictive model. In one embodiment, force applied by the calculation points is calculated between the manipulation point and grasp point.

At action 1222, the virtual object is manipulated by interaction between at least some of the calculation points of the predictive model and the dynamically selected manipulation point. In one embodiment, flowchart 1200 further includes detecting opposable motion and positions of the calculation points of the hand using the predictive model. In another embodiment, it includes detecting opposable motion and positions of the calculation points of the hand using the predictive model, detecting a manipulation point proximate to a point of convergence of the opposable calculation points, and assigning a strength attribute to the manipulation point based on a degree of convergence of the opposable calculation points.

Flowchart 1200 further relates to detecting two or more hands in the 3D sensory space, generating predictive models of the respective hands, and using the predictive models to track respective motions of the hands. In one embodiment, the predictive models include positions of calculation points of the fingers, thumb and palm of the respective hands. In particular, it relates to dynamically selecting two or more manipulation points proximate to opposed sides of the virtual object based on the motion tracked by the respective predictive models and positions of one or more of the calculation points of the respective predictive models, defining a selection plane through the virtual object linking the two or more manipulation points, and manipulating the virtual object responsive to manipulation of the selection plane.

Flowchart 1200 also includes dynamically selecting an grasp point for the predictive model proximate to convergence of two or more of the calculation points, assigning a strength attribute to the grasp point based on a degree of convergence to the dynamically selected manipulation point proximate to the virtual object, and manipulating the virtual object responsive to the grasp point strength attribute when the grasp point and the manipulation point are within a predetermined range of each other.

In one embodiment, the grasp point of a pinch gesture includes convergence of at least two opposable finger or thumb contact points. In another embodiment, wherein the grasp point of a grab gesture includes convergence of a palm contact point with at least one opposable finger contact point. In yet another embodiment, wherein the grasp point of a swat gesture includes convergence of at least two opposable finger contact points.

Flowchart 1200 includes using the predictive model to track motion of the hand and positions of the calculation points relative to two or more virtual objects to be manipulated, dynamically selecting one or more manipulation points proximate to at least one of the virtual objects based on the motion tracked by the predictive model and positions of the calculation points, and manipulating at least one of the virtual objects by interaction between at least some of the calculation points of the predictive model and the dynamically selected manipulation point.

Flowchart 1200 further includes using the predictive model to track motion of the hand and positions of the calculation points relative to two or more virtual objects to be manipulated, manipulating a first virtual object by interaction between at least some of the calculation points of the predictive model and at least one virtual manipulation point of the first virtual object, dynamically selecting at least one manipulation point of a second virtual object responsive to convergence of calculation points of the first virtual object, and manipulating the second virtual object when the virtual manipulation point of the first virtual object and the virtual manipulation point of the second virtual object are within a predetermined range of each other.

Figure 13:
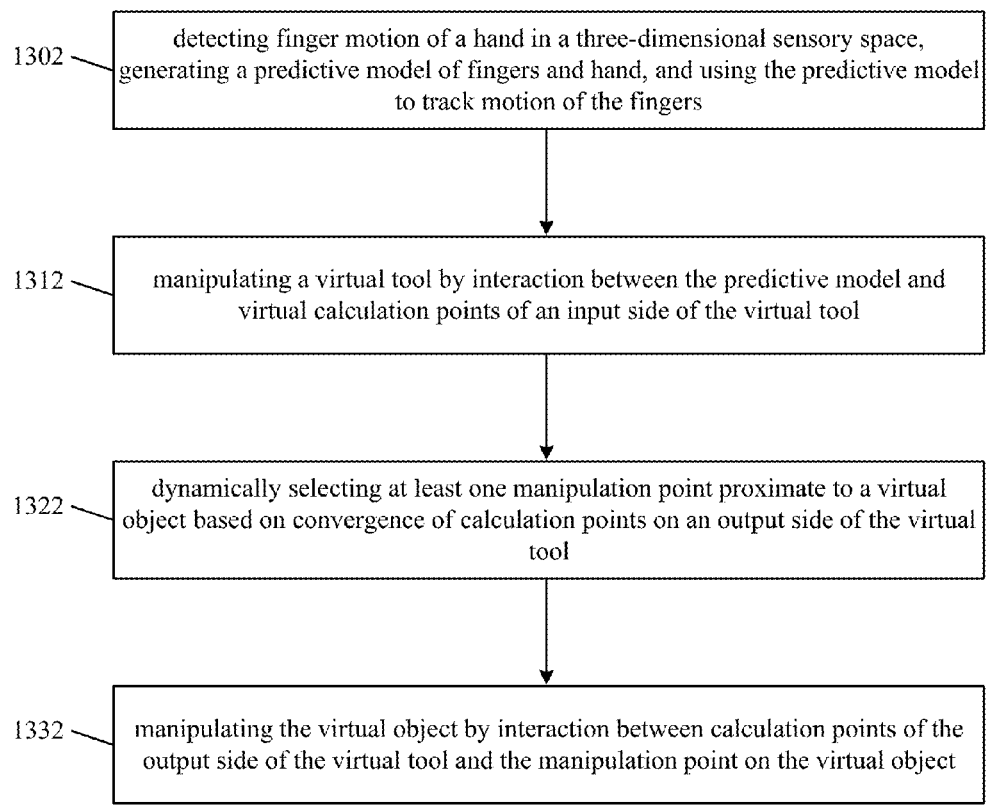
FIG. 13 is a representative method of operating a virtual tool that interacts with a virtual object.

FIG. 13 is a representative method 1300 of operating a virtual tool that interacts with a virtual object. Flowchart shown in FIG. 13 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 13. Multiple actions can be combined in some implementations. For convenience, this flowchart is described with reference to the system that carries out a method. The system is not necessarily part of the method.

At action 1302, finger motion of a hand in a three-dimensional (3D) sensory space is detected, a predictive model of fingers and hand is generated, and the predictive model is used to track motion of the fingers. The predictive model includes positions of calculation points of the fingers, thumb and palm of the hand. Flowchart 1300 further includes generating data for augmented display representing a position of the virtual object relative to the predictive model of the hand. It also includes, generating data for display representing positions in a rendered virtual space of the virtual object and the predictive model of the hand, according to one embodiment.

Flowchart 1300 also relates to manipulating the virtual object responsive to a proximity between at least some of the calculation points of the predictive model and the manipulation point of the virtual object.

In one embodiment, the calculation points include opposable finger tips and a base of the hand. In another embodiment, the calculation points include an opposable finger and thumb.

At action 1312, a virtual tool is manipulated by interaction between the predictive model and virtual calculation points of an input side of the virtual tool.

At action 1322, at least one manipulation point proximate to a virtual object is dynamically based on convergence of calculation points on an output side of the virtual tool.

At action 1332, the virtual object is manipulated by interaction between calculation points of the output side of the virtual tool and the manipulation point on the virtual object.

While the technology disclosed has been described by way of example and in terms of the specific embodiments, it is to be understood that the technology disclosed is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Particular Embodiments

In one embodiment, a computer implemented method for initializing predictive information comprises receiving predictive information and observed information of an object movable in space, determining an initialization parameter from the observed information and applying the initialization parameter to at least a portion of a model within the predictive information, thereby initializing the model portion.

In another embodiment, the receiving observed information of an object movable in space comprises receiving sensory information indicating a sensed presence or variance of at least one complex control object.

In another embodiment, the receiving predictive information of an object movable in space comprises receiving a model defining a complex control object.

In another embodiment, the determining an initialization parameter from the observed information comprises selecting one or more point pairings from a surface portion as represented in the observed information, determining a span having a span length for at least one of the one or more point pairings selected, determining a frequency of occurrence of span lengths, and selecting a span length as the initialization parameter based at least in part upon the frequency of occurrence.

In another embodiment, selecting one or more point pairings from a surface portion as represented in the observed information comprises selecting a first unmatched point on a contour representing a surface portion in the observed information, identifying a normal at the first unmatched point, and finding a closest second unmatched point reachable by a convex curve (line) having the most opposite normal.

In another embodiment, identifying a normal at the first unmatched point comprises determining a set of points proximate to the first unmatched point, and determining a normal for the first unmatched point using the other points in the set.

In another embodiment, determining a span having a span length for at least one of the one or more point pairings selected comprises determining a shortest convex curve passing through each point of the point pairing, determining that the curve fails to pass through other points of model, and providing the curve as the span.

In another embodiment, at least one of the spans has a horizontally disposed component.

In another embodiment, determining a frequency of occurrence of span lengths comprises smoothing a discrete relationship comprising discrete point pairings to a continuous curve.

In another embodiment, determining a frequency of occurrence of span lengths comprises fitting one or more radial basis functions to the observed span lengths, applying a function to the one or more radial basis functions to form a result, and providing the result comprising the frequency of occurrence of span lengths.

In another embodiment, fitting one or more radial basis functions to the observed span length comprises selecting for one or more observed span length values a radial basis function, and determining at least one property of the radial basis function selected.

In another embodiment, determining at least one property of the radial basis function selected comprises determining a variance of a dataset including the span lengths, dividing the variance by an expectation value determined from an expected number of modes in the dataset determined from the observed information, and providing the variance divided by the expectation value as a width of the radial basis function.

In another embodiment, applying a function to the one or more radial basis functions comprises applying a summation function to sum the radial basis functions thereby producing a frequency of occurrence for the span lengths.

In another embodiment, selecting a span length as the initialization parameter based at least in part upon the frequency of occurrence comprises determining one or more modes from the frequency of occurrence of the observed span lengths, selecting a mode of interest; and determining the initialization parameter from the mode of interest.

In another embodiment, applying the initialization parameter to at least a portion of a model within the predictive information; thereby initializing the model portion comprises scaling span lengths computed for the model portion by the initialization parameter.

In another embodiment, applying the initialization parameter to at least a portion of a model within the predictive information; thereby initializing the model portion comprises selecting a model portion based at least in part upon the initialization parameter.

In another embodiment, selecting a model portion based at least in part upon the initialization parameter comprises selecting a model portion representative of a tool tip.

In another embodiment, applying the initialization parameter to at least a portion of a model within the predictive information, thereby initializing the model portion comprises communicating control information to a machine sensory control system.

In another embodiment, communicating control information to a machine sensory control system comprises changing power consumption profiles based on size of observed object.

In another embodiment, applying the initialization parameter to at least a portion of a model within the predictive information, thereby initializing the model portion comprises applying the initialization parameter to at least a portion of a 3D model within the predictive information.

In another embodiment, storing one or more instructions which when executed by one or more processors cause the one or more processors to receive predictive information and observed information of an object movable in space, determine an initialization parameter from the observed information, and apply the initialization parameter to at least a portion of a model within the predictive information; thereby initializing the model portion.

In another embodiment, there is a system comprising a detection system to capture sensory information about a complex control object, and a variation determination system coupled to the detection system and configured to receive predictive information and observed information of an object movable in space, determine an initialization parameter from the observed information, and apply the initialization parameter to at least a portion of a model within the predictive information, thereby initializing the model portion.

In one embodiment, there is a computer implemented method for initializing a model, comprised of receiving at least one image of a control object observed in a 3D imaging space, calculating numerous span lengths between opposing sides of the control object, and determining a number of span modes of the control object applicable to a frequency distribution of the span lengths. For each span mode, this embodiment calculates one or more span width parameters from at least part of the distribution of the span lengths, using the span width parameters to initialize at least a portion of a model of the control object, and generating predictive information from the initialized model.

In another embodiment, the method further includes receiving an image of a hand as the control object, determining that the span modes include at least a finger width span mode and a palm width span mode, and using the span width parameters for the finger width and palm width span modes to initialize a model of the hand.

In another embodiment, the method further includes receiving an image of a hand as the control object, determining that the span modes include at least a finger width span mode, a palm width span mode, and a wrist width span mode, and using the span width parameters for the finger width, palm width, and wrist width span modes to initialize a model of the hand and arm.

In another embodiment, the method further includes pairing boundary points on the opposing sides of the control object by selecting pairs of points on opposing boundaries that have opposing boundary normals and that can be connected by convex curve, which includes a straight line, without the convex curve crossing any other boundary points of the control object, wherein each boundary normal is perpendicular to a boundary and pointed away from a center of the control object, and calculating the span length between paired boundary points as a shortest convex curve between the paired boundary points.

In another embodiment, the method further includes pairing boundary points on the opposing sides of the control object by selecting points on opposing boundaries that have opposing boundary normals and that can be connected by geodesic segment without the geodesic segment crossing any other boundary points of the control object, wherein each boundary normal is perpendicular to a boundary and pointed away from a center of the control object, and calculating the span length between paired boundary points as a shortest geodesic segment between the paired boundary points.

In another embodiment, the method further includes determining from the image of the control object a number of modes of span width distributions present in the image, and using at least the number of modes present to select the model of the control object used to generate the predictive information.

In another embodiment, the method further includes bucketing the span lengths to form a histogram distribution, and analyzing at least a frequency of span lengths in buckets to determine the number of modes present.

In another embodiment, the method further includes selecting a plurality of radial basis functions to approximate distribution of span lengths, fitting a curve to the radial basis functions, and analyzing the fitted curve to determine the number of modes present.

In another embodiment, the method further includes testing a distribution of the span lengths against alternative expected values of span lengths for a plurality of control object models, and determining the number of modes present from the testing of the distribution against the control object models.

In another embodiment, the method further includes scaling the model of the control object based at least in part on the span width parameters.

In another embodiment, the method further includes determining from the image of the control object a number of modes of span width distributions present in the image, and using the number of modes present to select a software mode of operation, wherein the software mode of operation is selected from a group that includes at least tool movement interpretation, hand gesture interpretation, and facial expression interpretation.

In another embodiment, the method further includes using the span width parameters to select a software mode of operation, wherein the software mode of operation is selected from a group that includes at least tool movement interpretation, hand gesture interpretation, and facial expression interpretation.

In another embodiment, the method further includes representing portions of the model as capsoloids, and generating predictive information including detection of collisions between two or more of the capsoloids.

In another embodiment, the method further includes representing portions of the model as capsoloids, and generating predictive information including detection of non-rigid translations of portions of the model.

In another embodiment, the method further includes, wherein determining the frequency distribution of span lengths comprises fitting one or more radial basis functions to the observed span lengths, applying a function to the one or more radial basis functions to form a result, and providing the result comprising the frequency of occurrence of span lengths.

In another embodiment, the method further includes, wherein fitting one or more radial basis functions to the observed span length comprises selecting for one or more observed span length values a radial basis function, and determining at least one property of the radial basis function selected.

In another embodiment, the method further includes, wherein determining at least one property of the radial basis function selected comprises determining a variance of a dataset including the span lengths, dividing the variance by an expectation value determined from an expected number of modes in the dataset determined from the observed information, and providing the variance divided by the expectation value as a width of the radial basis function.

In another embodiment, the method further includes, wherein applying a function to the one or more radial basis functions comprises applying a summation function to sum the radial basis functions thereby producing a frequency of occurrence for the span lengths.

In another embodiment, the method further includes selecting span lengths as the initialization parameters based at least in part upon the frequency of occurrence comprising determining one or more modes from the frequency of occurrence of the observed span lengths, selecting a mode of interest, and determining the initialization parameter from the mode of interest.

In another embodiment, the method further includes applying the initialization parameter to at least a portion of a model within the predictive information, thereby initializing the model portion including scaling span lengths computed for the model portion by the initialization parameter.

In another embodiment, there can be a computer implemented system for initializing a model—comprising at least one camera for capturing at least one image of a control object observed in a 3D imaging space, and an image analysis module for calculating numerous span lengths between opposing sides of the control object, and determining a number of span modes of the control object applicable to a frequency distribution of the span lengths. For each span mode, calculating one or more span width parameters from at least part of the distribution of the span lengths, using the span width parameters to initialize at least a portion of a model of the control object, and generating predictive information from the initialized model.

In another embodiment, the image analysis module pairs boundary points on the opposing sides of the control object by selecting pairs of points on opposing boundaries that have opposing boundary normals and that can be connected by convex curve, which includes a straight line, without the convex curve crossing any other boundary points of the control object. Each boundary normal is perpendicular to a boundary and pointed away from a center of the control object, and calculating the span length between paired boundary points as a shortest convex curve between the paired boundary points.

In another embodiment, the image analysis module determines from the image of the control object a number of modes of span width distributions present in the image, and using at least the number of modes present to select the model of the control object used to generate the predictive information.

In another embodiment, the image analysis module determines the frequency distribution of span lengths comprising fitting one or more radial basis functions to the observed span lengths, applying a function to the one or more radial basis functions to form a result, and providing the result comprising the frequency of occurrence of span lengths.

The invention claimed is:

1. A computer implemented method for initializing a model, comprising:
receiving at least one image of a control object observed in a 3D imaging space;
calculating span lengths between opposing sides of the control object;
determining a number of span modes of the control object applicable to a frequency distribution of the span lengths;
for each span mode, calculating one or more span width parameters from at least part of the distribution of the span lengths;
using the span width parameters to initialize at least a portion of a model of the control object; and
generating predictive information from an initialized model.

2. The method of claim 1, further including:
receiving an image of a hand as the control object;
determining that the span modes include at least a finger width span mode and a palm width span mode; and
using the span width parameters for the finger width and palm width span modes to initialize a model of the hand.

3. The method of claim 1, further including:
receiving an image of a hand as the control object;
determining that the span modes include at least a finger width span mode, a palm width span mode, and a wrist width span mode; and
using the span width parameters for the finger width, palm width, and wrist width span modes to initialize a model of the hand and arm.

4. The method of claim 1, further including calculating at least ten span lengths.

5. The method of claim 1, further including calculating between ten and 1000 span lengths.

6. The method of claim 1, further including calculating between 100 and 10,000 span lengths.

7. The method of claim 1, further including calculating between 1,000 and 1,000,000 span lengths.

8. The method of claim 1, further including:
pairing boundary points on the opposing sides of the control object by selecting pairs of points on opposing boundaries that have opposing boundary normals and that can be connected by convex curve, which includes a straight line, without the convex curve crossing any other boundary points of the control object;
wherein each boundary normal is perpendicular to a boundary and pointed away from a center of the control object; and
calculating the span length between paired boundary points as a shortest convex curve between the paired boundary points.

9. The method of claim 1, further including:
pairing boundary points on the opposing sides of the control object by selecting points on opposing boundaries that have opposing boundary normals and that can be connected by geodesic segment without the geodesic segment crossing any other boundary points of the control object;
wherein each boundary normal is perpendicular to a boundary and pointed away from a center of the control object; and
calculating the span length between paired boundary points as a shortest geodesic segment between the paired boundary points.

10. The method of claim 1, further including:
determining from the image of the control object a number of modes of span width distributions present in the image; and using at least the number of modes present to select the model of the control object used to generate the predictive information.

11. The method of claim 10, further including:
bucketing the span lengths to form a histogram distribution; and
analyzing at least a frequency of span lengths in buckets to determine the number of modes present.

12. The method of claim 10, further including:
selecting a plurality of radial basis functions to approximate distribution of span lengths;
fitting a curve to the radial basis functions; and
analyzing a fitted curve to determine the number of modes present.

13. The method of claim 10, further including:
testing a distribution of the span lengths against alternative expected values of span lengths for a plurality of control object models; and
determining the number of modes present from the testing of the distribution against the control object models.

14. The method of claim 1, further including:
scaling the model of the control object based at least in part on the span width parameters.

15. The method of claim 1, further including:
determining from the image of the control object a number of modes of span width distributions present in the image; and
using the number of modes present to select a software mode of operation, wherein the software mode of operation is selected from a group that includes at least tool movement interpretation, hand gesture interpretation, and facial expression interpretation.

16. The method of claim 1, further including:
using the span width parameters to select a software mode of operation, wherein the software mode of operation is selected from a group that includes at least tool movement interpretation, hand gesture interpretation, and facial expression interpretation.

17. The method of claim 1, further including:
representing portions of the model as capsoloids; and
generating predictive information including detection of collisions between two or more of the capsoloids.

18. The method of claim 1, further including:
representing portions of the model as capsoloids; and
generating predictive information including detection of non-rigid translations of portions of the model.

19. The method of claim 1, wherein determining the frequency distribution of span lengths comprises:
fitting one or more radial basis functions to observed span lengths;
applying a function to the one or more radial basis functions to form a result; and
providing the result comprising frequency of occurrence of span lengths.

20. The method of claim 19, wherein fitting one or more radial basis functions to the observed span length comprises:
selecting for one or more observed span length values a radial basis function; and
determining at least one property of the radial basis function selected.

21. The method of claim 20, wherein determining at least one property of the radial basis function selected comprises:
determining a variance of a dataset including the span lengths;
dividing the variance by an expectation value determined from an expected number of modes in the dataset determined from observed information; and
providing the variance divided by the expectation value as a width of the radial basis function.

22. The method of claim 19, wherein applying a function to the one or more radial basis functions comprises:
applying a summation function to sum the radial basis functions thereby producing a frequency of occurrence for the span lengths.

23. The method of claim 1, wherein selecting span lengths as initialization parameters based at least in part upon a frequency of occurrence comprises:
determining one or more modes from the frequency of occurrence of observed span lengths;
selecting a mode of interest; and
determining the initialization parameter from the mode of interest.

24. The method of claim 1, wherein applying the initialization parameter to at least a portion of a model within the predictive information; thereby initializing the model portion comprises:
scaling span lengths computed for the model portion by the initialization parameter.

25. A computer implemented system for initializing a model, comprising:
at least one camera that captures at least one image of a control object observed in a 3D imaging space;
a processor coupled to the camera, memory coupled to the processor and computer instructions in the memory that implement a method including:
calculating numerous span lengths between opposing sides of the control object;
determining a number of span modes of the control object applicable to a frequency distribution of the span lengths;
for each span mode, calculating one or more span width parameters from at least part of the distribution of the span lengths;
using the span width parameters to initialize at least a portion of a model of the control object; and
generating predictive information from the initialized model.

26. The system of claim 25, wherein an image analysis module pairs boundary points on the opposing sides of the control object by selecting pairs of points on opposing boundaries that have opposing boundary normals and that can be connected by convex curve, which includes a straight line, without the convex curve crossing any other boundary points of the control object;
wherein each boundary normal is perpendicular to a boundary and pointed away from a center of the control object; and
calculating the span length between paired boundary points as a shortest convex curve between the paired boundary points.

27. The system of claim 25, wherein the image analysis module determines from the image of the control object a number of modes of span width distributions present in the image; and
using at least the number of modes present to select the model of the control object used to generate the predictive information.

28. The system of claim 25, wherein the image analysis module determines the frequency distribution of span lengths comprising:

fitting one or more radial basis functions to observed span lengths;

applying a function to the one or more radial basis functions to form a result; and providing the result comprising the frequency of occurrence of span lengths.

* * * * *